(12) United States Patent
Walker et al.

(10) Patent No.: US 11,847,382 B2
(45) Date of Patent: Dec. 19, 2023

(54) DECK CONFIGURATION SYSTEM

(71) Applicant: Peak Innovations Inc., Richmond (CA)

(72) Inventors: Simon Walker, Delta (CA); Craig Lawson, Burnaby (CA); Adam Mantei, Burnaby (CA); Pedram Faghani, Vancouver (CA); Michael Stuart, New Westminster (CA); Pascal Labbee, Granby (CA); Siamak Riahi, Montreal (CA)

(73) Assignee: Peak Innovations Inc., Richmond (CA)

( * ) Notice: Subject to any disclaimer, the term of this patent is extended or adjusted under 35 U.S.C. 154(b) by 0 days.

(21) Appl. No.: 17/025,195

(22) Filed: Sep. 18, 2020

(65) Prior Publication Data

US 2021/0064793 A1 Mar. 4, 2021

Related U.S. Application Data

(63) Continuation-in-part of application No. 16/344,761, filed as application No. PCT/CA2017/051443 on Nov. 30, 2017, now abandoned.

(Continued)

(51) Int. Cl.
| | | |
|---|---|---|
| *G06F 30/12* | (2020.01) | |
| *G06F 30/13* | (2020.01) | |
| *G06F 3/0488* | (2022.01) | |
| *H04N 7/15* | (2006.01) | |
| *G06Q 30/0283* | (2023.01) | |

(52) U.S. Cl.
CPC ............ *G06F 30/12* (2020.01); *G06F 3/0488* (2013.01); *G06F 30/13* (2020.01); *G06Q 30/0283* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 4,267,569 A | * | 5/1981 | Baumann | F02D 41/266 701/99 |
| 4,918,880 A | * | 4/1990 | Carney | A47C 11/00 297/217.7 |

(Continued)

OTHER PUBLICATIONS

Fortress Building Products Launches New Deck and Outdoor Visualizer, FortressView™: FortressView™ takes the guesswork out of exterior home design, simplifies bringing dream decks from concept to reality PR Newswire [New York] Sep. 14, 2020. (Year: 2020).*

(Continued)

*Primary Examiner* — Folashade Anderson
(74) *Attorney, Agent, or Firm* — Oyen Wiggs Green & Mutala LLP

(57) ABSTRACT

A system for facilitating construction of a deck comprises a server, a client computer, and a database. A user inputs, through a graphical user interface on the display of the client computer, a configuration for the deck. The server receives the deck information from the client computer and determines, based on information in the database and the deck information, a parts list and instruction information. The instruction information includes information on the alterations to the parts needed to construct the deck. The parts list and the instruction information may be displayed on the user interface.

8 Claims, 21 Drawing Sheets

Related U.S. Application Data

(60) Provisional application No. 62/428,125, filed on Nov. 30, 2016.

(56) References Cited

U.S. PATENT DOCUMENTS

| | | | | |
|---|---|---|---|---|
| 6,625,509 | B1* | 9/2003 | Flynn, Sr. | G06Q 10/06 |
| | | | | 700/106 |
| 10,304,254 | B2* | 5/2019 | Jovanovic | G01S 17/89 |
| 10,997,553 | B2* | 5/2021 | McLinden | G06T 17/05 |
| 2002/0065764 | A1* | 5/2002 | Brodersen, Jr. | G06Q 30/08 |
| | | | | 705/37 |
| 2002/0199132 | A1* | 12/2002 | Lachimia | G06F 11/2257 |
| | | | | 714/14 |
| 2004/0205519 | A1* | 10/2004 | Chapel | G06Q 10/06 |
| | | | | 715/211 |
| 2005/0289022 | A1* | 12/2005 | Lida | G06Q 10/087 |
| | | | | 705/29 |
| 2006/0095320 | A1* | 5/2006 | Jones | G06Q 30/0253 |
| | | | | 705/14.51 |
| 2006/0131382 | A1* | 6/2006 | Thatcher | G06Q 30/02 |
| | | | | 235/376 |
| 2006/0259171 | A1* | 11/2006 | Cruz | G06Q 10/08 |
| | | | | 700/95 |
| 2007/0239561 | A1* | 10/2007 | Tusing | G06Q 30/0283 |
| | | | | 705/26.4 |
| 2008/0059220 | A1* | 3/2008 | Roth | G06Q 30/018 |
| | | | | 705/311 |
| 2008/0261699 | A1* | 10/2008 | Topham | G07F 17/32 |
| | | | | 463/42 |
| 2012/0215500 | A1* | 8/2012 | Ciuti | G06F 30/13 |
| | | | | 703/1 |
| 2014/0316916 | A1* | 10/2014 | Hay | G06Q 20/20 |
| | | | | 705/17 |
| 2015/0234377 | A1 | 8/2015 | Mizikovsky | |
| 2015/0363950 | A1* | 12/2015 | Gilbert | G06T 11/20 |
| | | | | 345/632 |
| 2018/0239837 | A1* | 8/2018 | Wang | G06F 16/17 |
| 2019/0205363 | A1* | 7/2019 | Zukerman | G06F 40/131 |
| 2021/0019454 | A1* | 1/2021 | Knudsen | G06F 30/13 |
| 2021/0248372 | A1* | 8/2021 | Schuster | G06F 3/0484 |

OTHER PUBLICATIONS

Computer can draw up deck design: [North Sports Final, CN Edition] Moffat, Gary. Chicago Tribune (pre-1997 Fulltext) [Chicago, Ill] Jun. 2, 1989: 65. (Year: 1989).*

Examination Report No. 2 issued by IP Australia dated Jul. 6, 2023 in respect of Australian Patent Application No. 2017367752.

* cited by examiner

Fig. 21

DECK CONFIGURATION SYSTEM

CROSS-REFERENCE TO RELATED APPLICATIONS

This application is a continuation-in-part of U.S. patent application Ser. No. 16/344,761 filed Apr. 24, 2019, which is a national stage application, filed under 35 U.S.C. § 371, of International Patent Application No. PCT/CA2017/051443 filed Nov. 30, 2017, which claims the benefit of U.S. Provisional Patent Application No. 62/428,125 filed Nov. 30, 2016, each of which is incorporated by reference herein in its entirety.

FIELD OF THE INVENTION

The invention relates to a system for facilitating the construction of a railing system for a deck.

BACKGROUND OF THE INVENTION

Railing systems for any number of outdoor applications are well-known. For example, residential decks, pool decks, and playgrounds all utilize any number of conventional railing systems. Conventional railing systems typically comprise elongated railings, posts, pickets, spacers, and other associated hardware.

When designing a railing system for a structure (e.g. a deck), several factors come into consideration. These may include factors such as aesthetics, the dimensions of the structure, building code requirements, etc. As these factors may be different for different projects, the railing system itself may vary from project to project.

Once a particular railing system has been designed, it is useful and important to determine the type and amount of the railing hardware required to build the railing system. In some cases, railing hardware is not individually sold but instead, several pieces of hardware are bundled together in kits. For example, a kit may contain a number of pickets and spacers. In such cases, it would be beneficial to determine the minimum number of kits required to construct the particular railing system in order to avoid unnecessary wastage.

SUMMARY OF THE INVENTION

According to one aspect of the invention, a system for facilitating construction of a deck comprises a server, a database, and a client computer. The database is operationally connected to the server, with the database comprising parts information regarding a plurality of parts for the deck. The client computer is in communication with the server, with the client computer comprising a display for displaying a user interface. The client computer is configured to accept input through the user interface regarding deck information, with the deck information comprising information regarding dimensions and layout of the deck. The client computer is further configured to transmit the deck information to the server. The server is configured to convert the deck information into component information, with the component information comprising information regarding one or more of the individual components of the deck. The server is further configured to generate, based at least in part on the component information and the parts information, a list comprising minimum quantities of the parts required for the deck. The server is further configured to generate, based at least in part on the component information and the list, instruction information regarding alterations to be made to the parts required for the deck. The server is further configured to send the list and the instruction information to the client computer for display on the user interface.

In another aspect of the invention, the system further comprises a customer service computer in communications with the server and the client computer. The user interface is further configured to allow the client computer to start a chat session with the customer service computer.

In yet another aspect of the invention, the chat session is a video chat session.

In still yet another aspect of the invention, the chat session is an audio chat session.

In a further aspect of the invention, the database further comprises ordering information. The ordering information comprises information regarding pricing and inventory of each of the plurality of parts.

In still a further aspect of the invention, the server is further configured to generate a price, wherein the price is based, at least in part, on the pricing and the inventory of the parts required for the deck.

In yet a further aspect of the invention, the user interface is further configured to accept touch input for drawing an outline for the deck.

In still yet a further aspect of the invention, the plurality of parts comprises one or more of the following: railings, pickets, posts, and panels.

In still another aspect of the invention, the user interface is further configured to allow for changes to the deck information.

In still yet another aspect of the invention, the user interface is further configured to display a graphical representation of the deck based, at least in part, on the deck information.

In another aspect of the invention, a method for facilitating construction of a deck comprises providing a user interface on a display of a client computer; accepting, through the user interface, deck information, wherein the deck information comprises information regarding dimensions and layout of the deck; communicating the deck information to a server, wherein the server is configured to convert the deck information into component information, wherein the component information comprises information regarding one or more of the individual components of the deck; accessing, by the server, parts information from a server, wherein the parts information comprises information regarding a plurality of parts for the deck; determining, by the server, a list comprising minimum quantities of the parts required for the deck, wherein the determination is based, at least in part, on the component information and the parts information; determining, by the server, instruction information regarding alterations to be made to the parts required for the deck, wherein the determination is based, at least in part, on the component information and the list; and transmitting, by the server, the list and the instruction information to the client computer for display by the user interface.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The preferred embodiment of the invention will be described by reference to the drawings thereof, in which:

FIG. 21 depicts a screenshot of the user interface showing the parts list in accordance with the embodiment of FIG. 17.

DETAILED DESCRIPTION OF THE INVENTION

Figure 1:
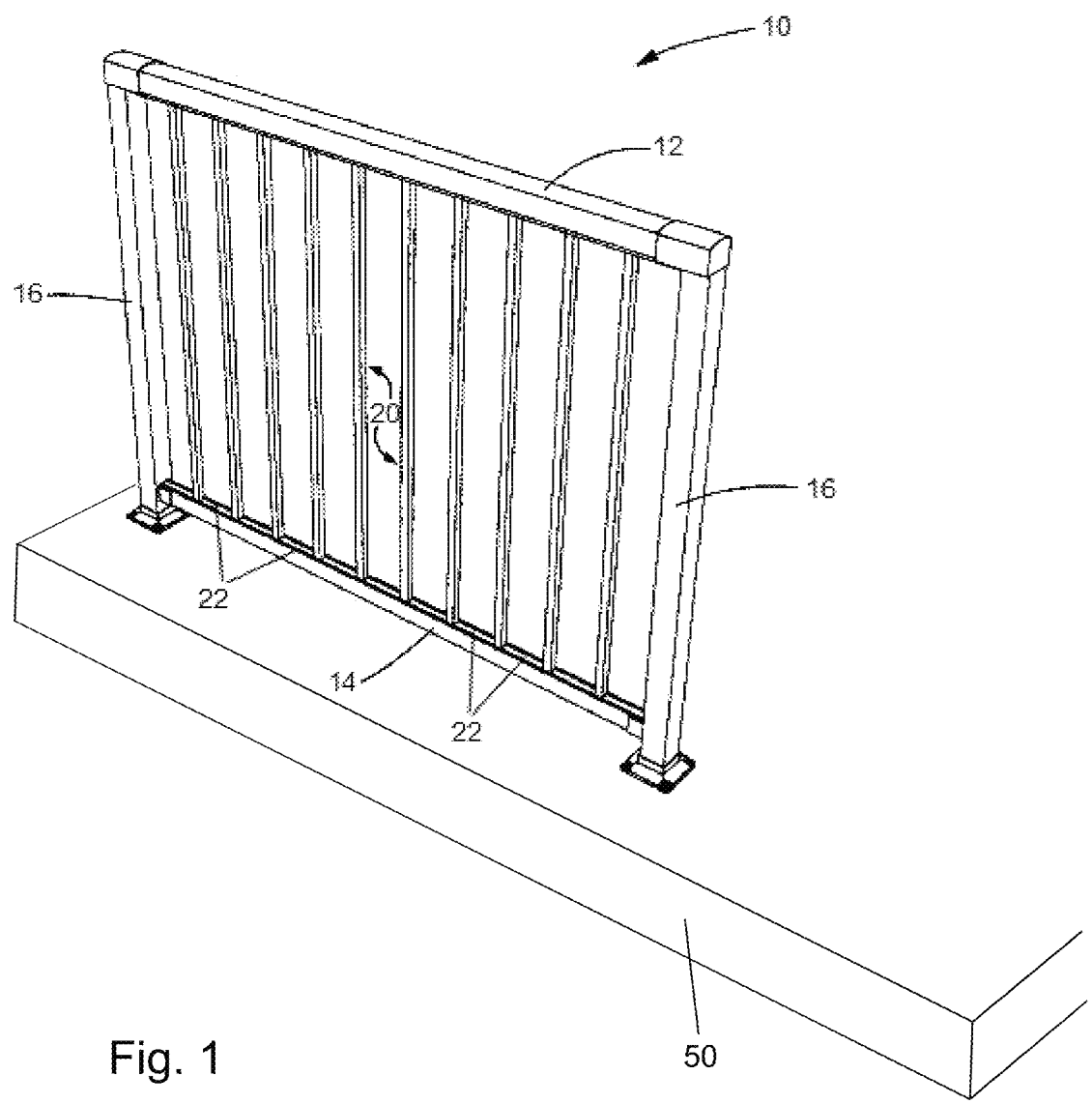
FIG. 1 depicts a portion of an exemplary railing system.

Referring to FIG. 1, a typical railing set 10 for a deck 50 comprises one or more hand rails 12, one or more base rails 14, and one or more posts 16. The posts 16 shown in FIG. 1 are end posts, but the posts 16 may also be mid posts (where the post is in between two rails), corner posts (where the post is in a corner), or stair posts (where the post is attached to stairs). In addition, the railing system 10 may also comprise one or more pickets 20 and spacers 22 (that engage with either the hand rail 12 or the base rail 14 and extend between the pickets 20). Panels 18 may also be included that extend between the hand rails 12 and the base rails 14. FIG. 1 only depicts a portion of a typical railing system 10, and it is understood that other components (e.g. stairs, gates, etc.) may also form part of the railing system 10.

Figure 2:
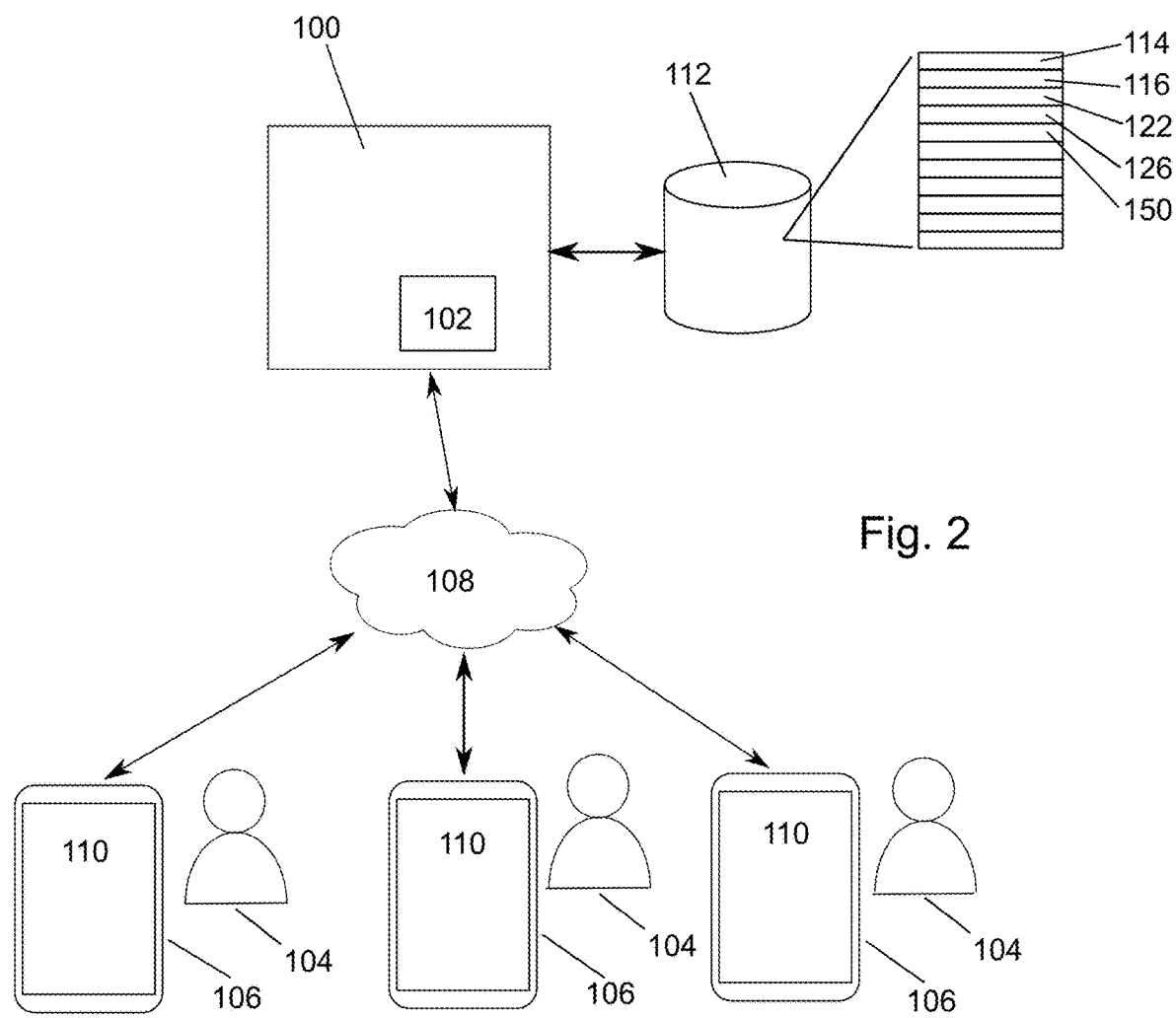
FIG. 2 is a block diagram of the preferred embodiment of the invention.

The present invention provides an efficient and convenient way to design the railing system 10 for the deck 50. Referring to FIG. 2, a host server 100 supports a host application 102 that is accessible by remote users 104. The remote users 104 are able to access the host application 102 using communication devices 106 over a communication network 108 (e.g. the Internet). The communication devices 106 may include computers, tablets, smartphones, or other computing devices. Each of the communication devices 106 is configured to display a user interface 110, which is preferably a graphical user interface.

Through the user interface 110, the remote users 104 are able to access the host application 102. For example, where the communication network 108 is the Internet, the host application 102 may be a web-based application that may be accessed using a browser program on the communication device 106 and viewed using the user interface 110.

The host application 102 is associated with a database 112. The database 112 comprises various data, including railing parts data 114 and railing kit data 116. The railing parts data 114 comprises data on one or more types of railing parts 118. The various components of the railing system 10 form the railing parts 118. These components may include items such as pickets 20, hand rails 12, base rails 14, posts 16, spacers 22, gates, brackets, or the like. The railing parts data 114 includes data not only identifying the types of railing parts 118, but also includes data on characteristics of each of the types of railing parts 118. Such characteristics may include colour, dimensions, and any particular usage requirements for the railing part 118.

The railing kit data 116 comprises data regarding the organization of one or more railing parts 118 into one or more kits 120. For example, railing parts 118 are not always sold individually; instead, one or more railing parts 118 may be bundled or assembled together and sold as one kit 120. Different combinations and sets of railing parts 118 may be bundled or assembled together in a variety of ways to form a number of different kits 120. The railing kit data 116 includes data on the composition and organization of each of the kits 120.

Figure 3:
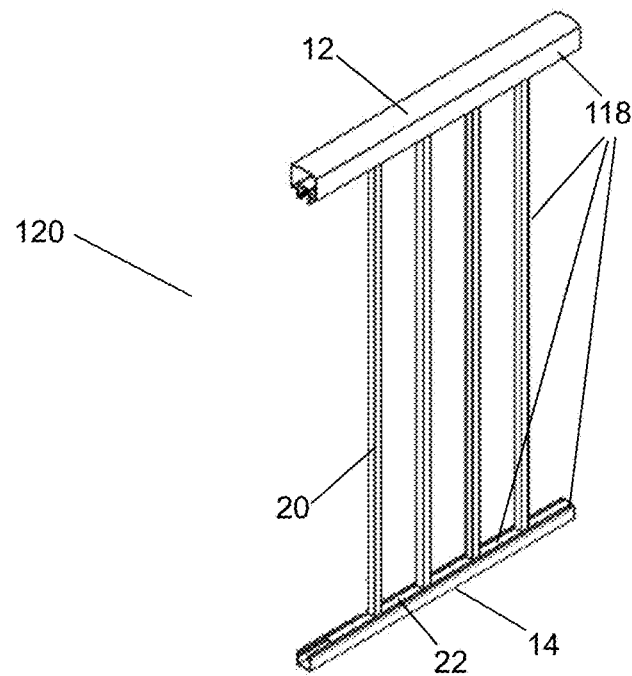
FIG. 3 shows an exemplary kit.

Referring to FIG. 3, an example of a kit 120 is shown. In this example, kit 120 comprises various railing parts 118, including four pickets 20, one hand rail 12, one base rail 14 and a number of spacers 22. It is understood that different kits 120 may comprise different amounts and combinations of various railing parts 118.

The database 112 may also comprise project data 122 (regarding projects 124 created by the remote users 104) and profile data 126 (regarding the remote users 104).

Figure 4:
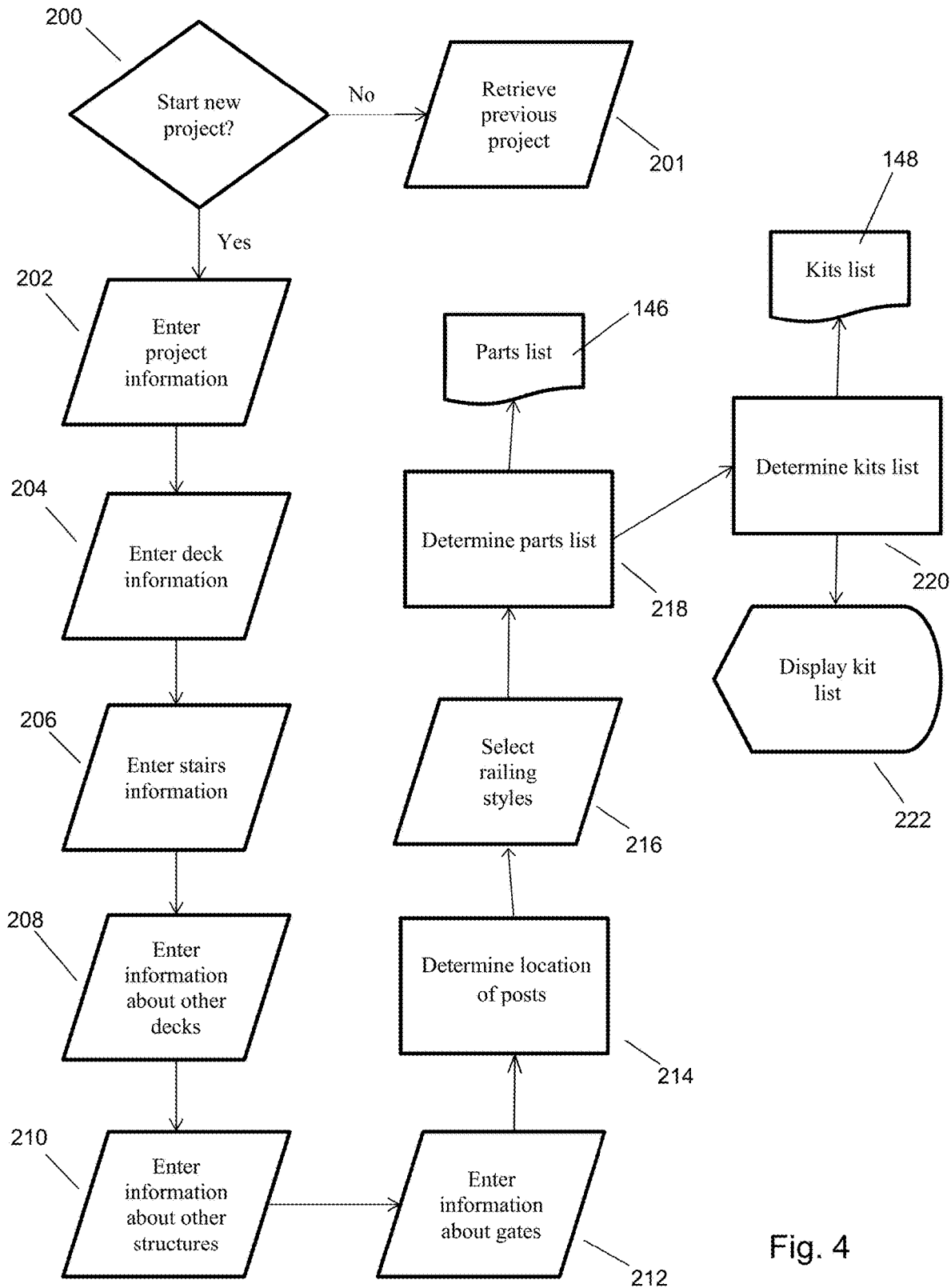
FIG. 4 is an overview of the process flow of the invention.

FIG. 4 illustrates the general flow of the process of the invention, which is described in more detail below.

Figure 5:
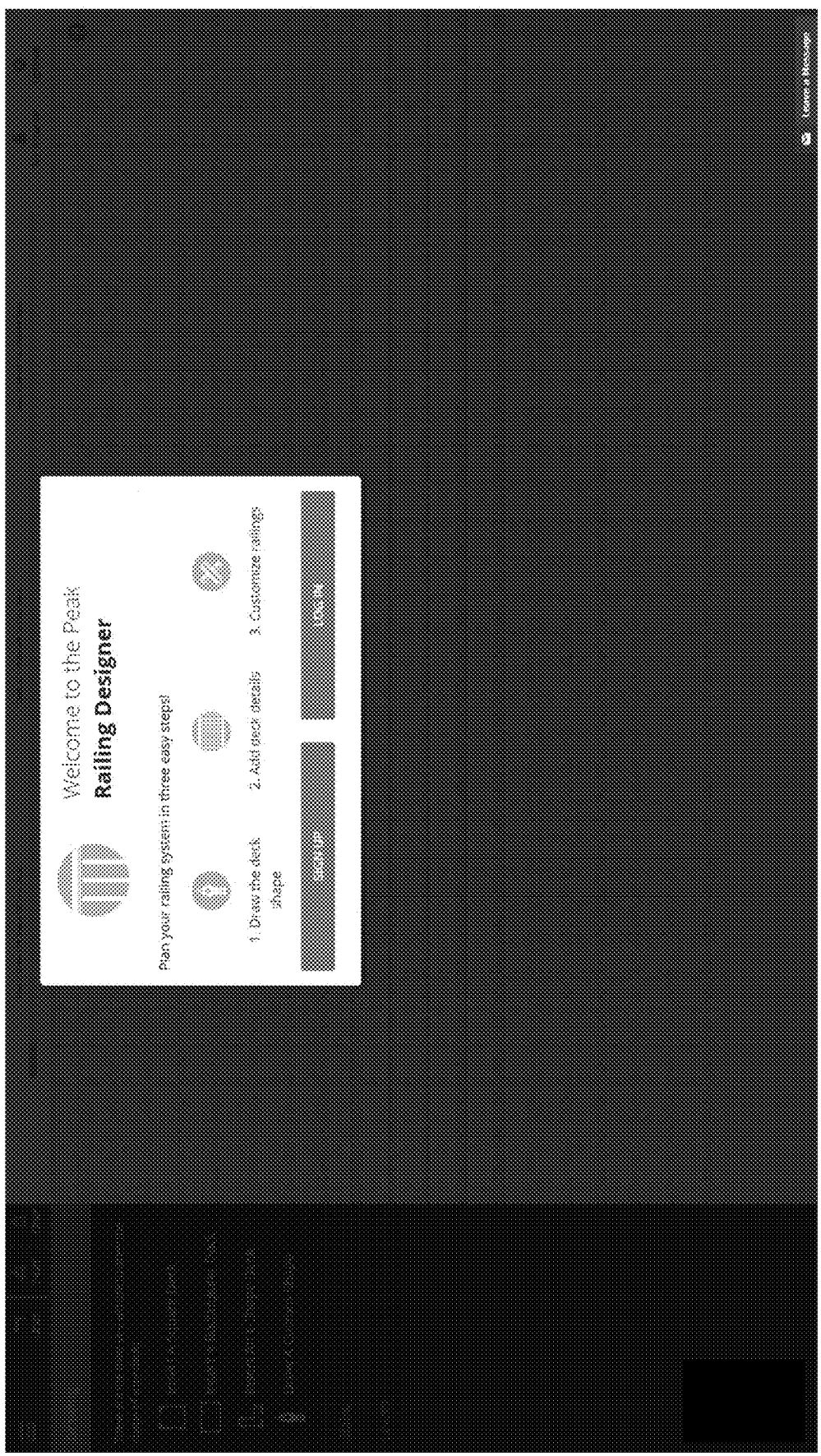
FIG. 5 depicts the start of the host application for the invention.

When the remote user 104 first initiates the host application 102, the remote user 104 may be prompted by the user interface 110 to enter a username and/or password in order to log on to the host application 102, as shown in FIG. 5. The host application 102 may then check to see whether the supplied username and password match those in the profile data 126 in the database 112. If they do match, then the host application 102 allows the remote user 104 to proceed. If they do not match, then the host application 102 may allow the remote user 104 to register, thereby creating an entry in the profile data 126 for the remote user 104. Alternatively, if the remote user 104 has forgotten his or her username and/or password, the remote user 104 may be provided with the opportunity to retrieve the username and/or password.

Figure 6:
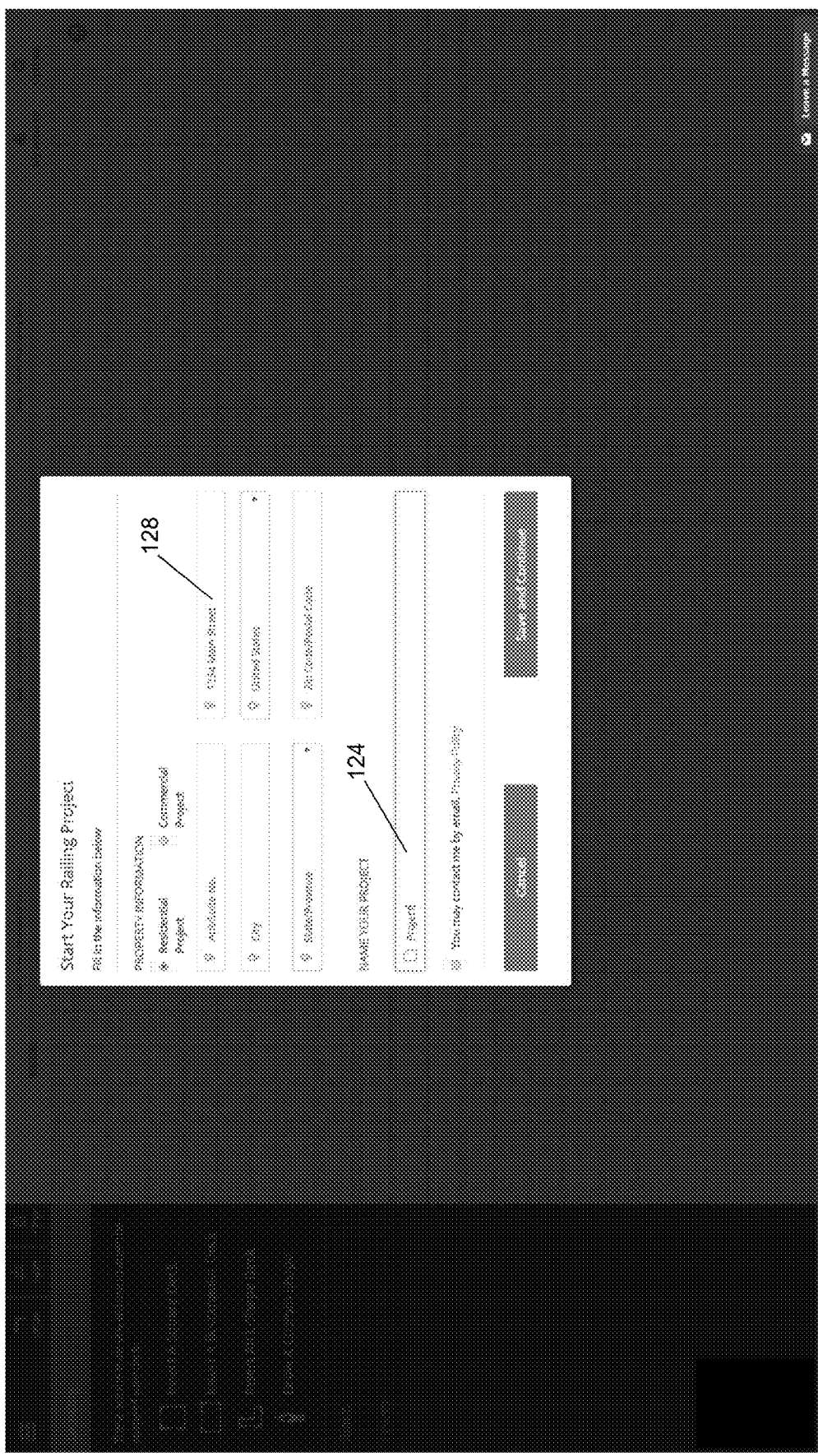
FIG. 6 depicts the input of project information for the invention.

After the remote user 104 has logged on, the remote user 104 may be prompted by the user interface 110 to start a new project 124 or to load a previously saved project 124 (step 200). If the remote user 104 starts a new project 124, the remote user 104 may be prompted (step 202) to enter information regarding the project 124, including an address 150 (or location) for the project 124 and whether the project 124 is for a residential or commercial property, as shown in FIG. 6. The remote user 104 may also be prompted to provide a name for the project 124. If the remote user 104 chooses to retrieve a previous project 124, the host application 102 may retrieve it from the project information 122 of the database 112 (step 201). The remote user 104 can then continue on with the project 124 from where it was last left.

Figure 7:
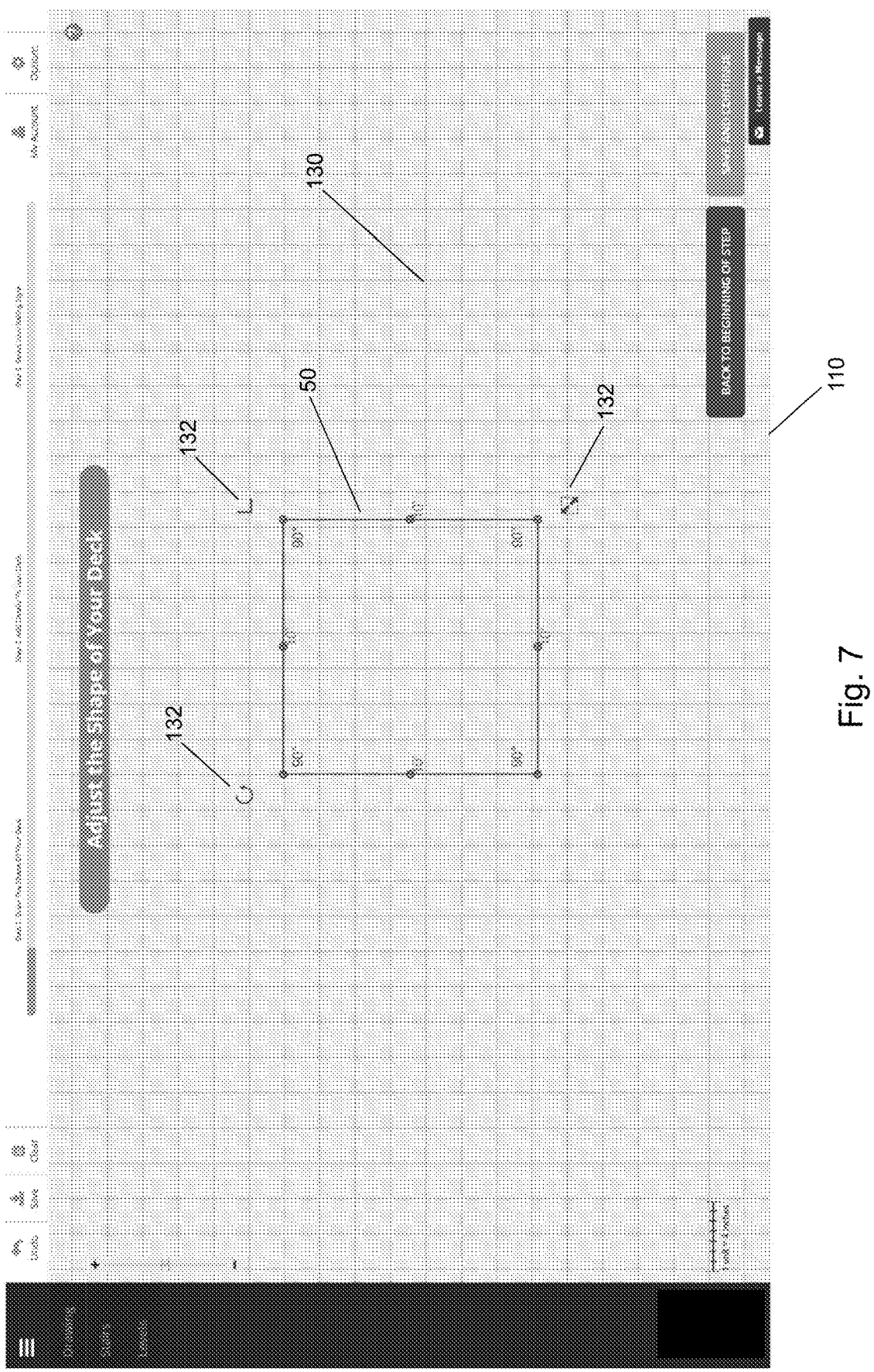
FIG. 7 depicts a graphical representation of an exemplary deck after input of the deck information.

The remote user 104 is then prompted to provide information regarding a defined area, such as the deck 50, for which the railing system 10 will be configured (step 204). Information regarding the deck 50 may include its dimensions and its shape (e.g. square, rectangular, L-shaped, irregularly-shaped, etc.). Preferably, where the user interface 110 is a graphical user interface, the user interface 110 provides the remote user 104 with a grid 130 on which the remote user 104 is able to produce a graphical representation of the deck 50, as shown in FIG. 7. This may be done by using a pointing device (e.g. a mouse) or using a touchscreen. It will be appreciated that in addition to decks, the defined area (or areas) may also be used for patios, balconies, stairs, landings, and the like.

Preferably, the user interface 110 may also depict various icons 132 that assist the remote user 104 in depicting the deck 50. For example, the icons 132 may allow the remote user 104 to rotate or scale the deck 50. In addition, the user interface 110 may allow the remote user 104 to precisely input the dimensions of the deck 50, and the host application 102 can automatically adjust the deck 50 depicted on the user interface 110 based on the inputted dimensions.

Preferably, the user interface 110 will also display the dimensions and relevant angles of the deck 50, as shown in FIG. 7.

Figure 8:
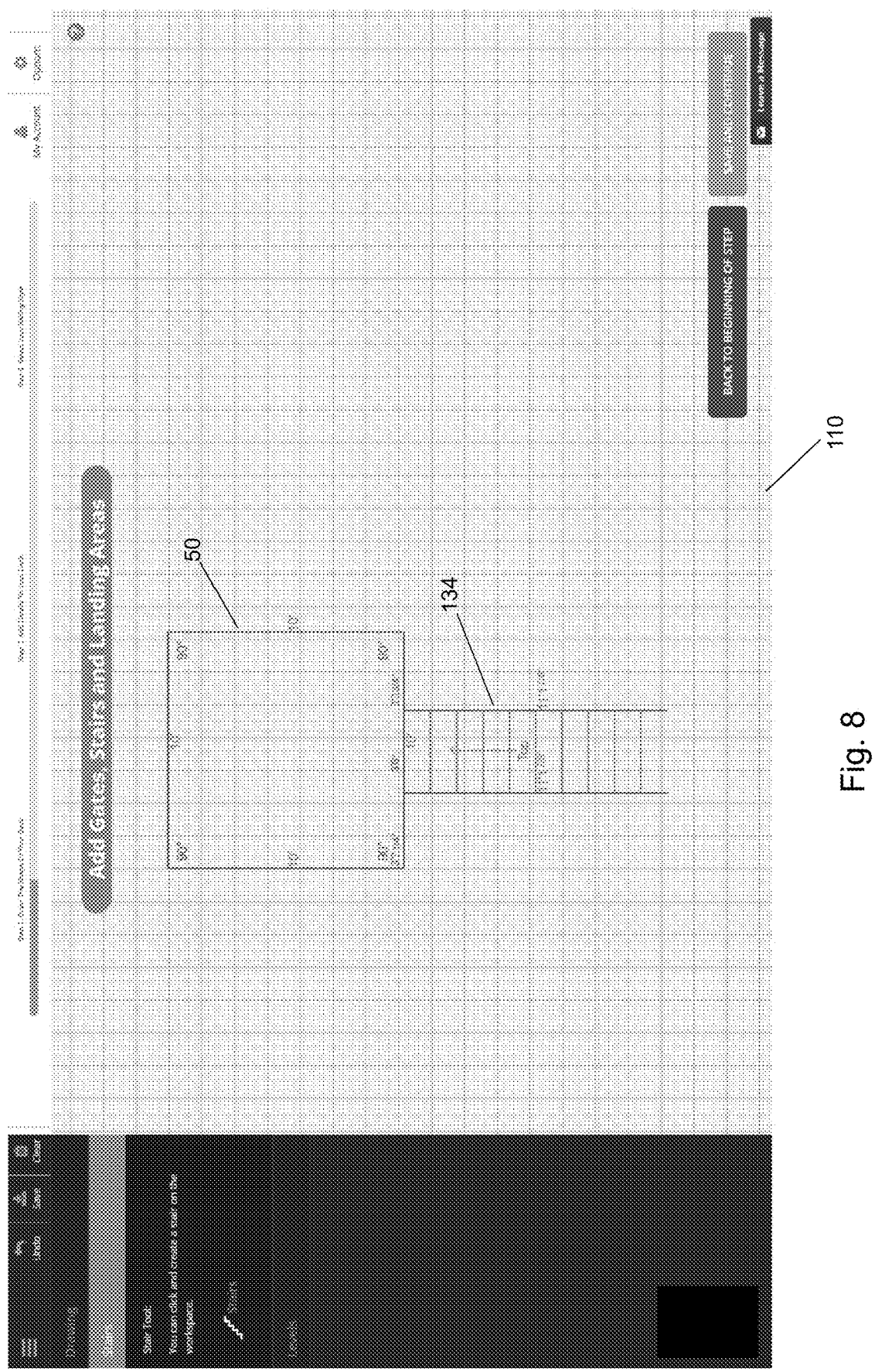
FIG. 8 depicts the deck after input of stairs information.

After the dimensions and configuration of the deck 50 have been specified and depicted on the user interface 110, the remote user 104 may be then prompted to indicate whether stairs 134 are to be added to the deck 50. If so, the user interface 110 may prompt the remote user 104 to provide information regarding one or more stairs 134 leading to the deck 50 (step 206). If the deck 50 is to have stairs 134, the remote user 104 is prompted to provide specifications for the stairs 134, which may include information regarding the width, rise, and/or run of the stairs 134. In addition, the remote user 104 may be prompted by the user interface 110 about the number of treads for the stairs 134 and the presence of gates 136 (e.g. top and/or bottom gates). Preferably, where the user interface 110 is a graphical user interface, once the remote user 104 has provided the information regarding the stairs 134, the user interface 110 will provide a graphical representation of the stairs 134, which the remote user 104 can manipulate via the user interface 110 to connect it graphically with the deck 50, as shown in FIG. 8.

After all of the stairs 134 have been specified and depicted on the user interface 110, the remote user 104 may then be prompted by the user interface 110 to provide information regarding additional decks 50, if any (step 208). If there are additional decks 50, the remote user 104 may be prompted to provide their dimensions, shape(s), etc. Preferably, where the user interface 110 is a graphical user interface, the remote user 104 is able to draw a graphical representation of the additional deck(s) 50 on the user interface 110 and manipulate them to connect with any existing deck 50 and/or stairs 134.

Preferably, if the remote user 104 does not connect the additional deck(s) 50 to any existing deck 50 and/or stairs 134, the user interface 110 will display an error message advising the remote user 104 of this.

The remote user 104 may also be prompted by the user interface 110 to specify whether the railing system 10 will be installed on the deck surface or on the deck fascia as this may affect the total length of railing required for the railing system 10.

Next, the user interface 110 may prompt the remote user 104 to provide information regarding existing structural features (step 210), such as columns 138 or walls 140. If such structural features are present, the remote user 104 may be prompted by the user interface 110 to provide their dimensions, locations, and/or shapes. For columns 138, this may preferably be carried out when the remote user 104 selects a side 156 of the deck 50 on the user interface 110 on which the column 138 is located. Once selected, the user interface 110 will then prompt the remote user 104 to provide the dimensions, positions, offsets, and general shape (e.g. round or square) of the column(s) 138.

Figure 9:
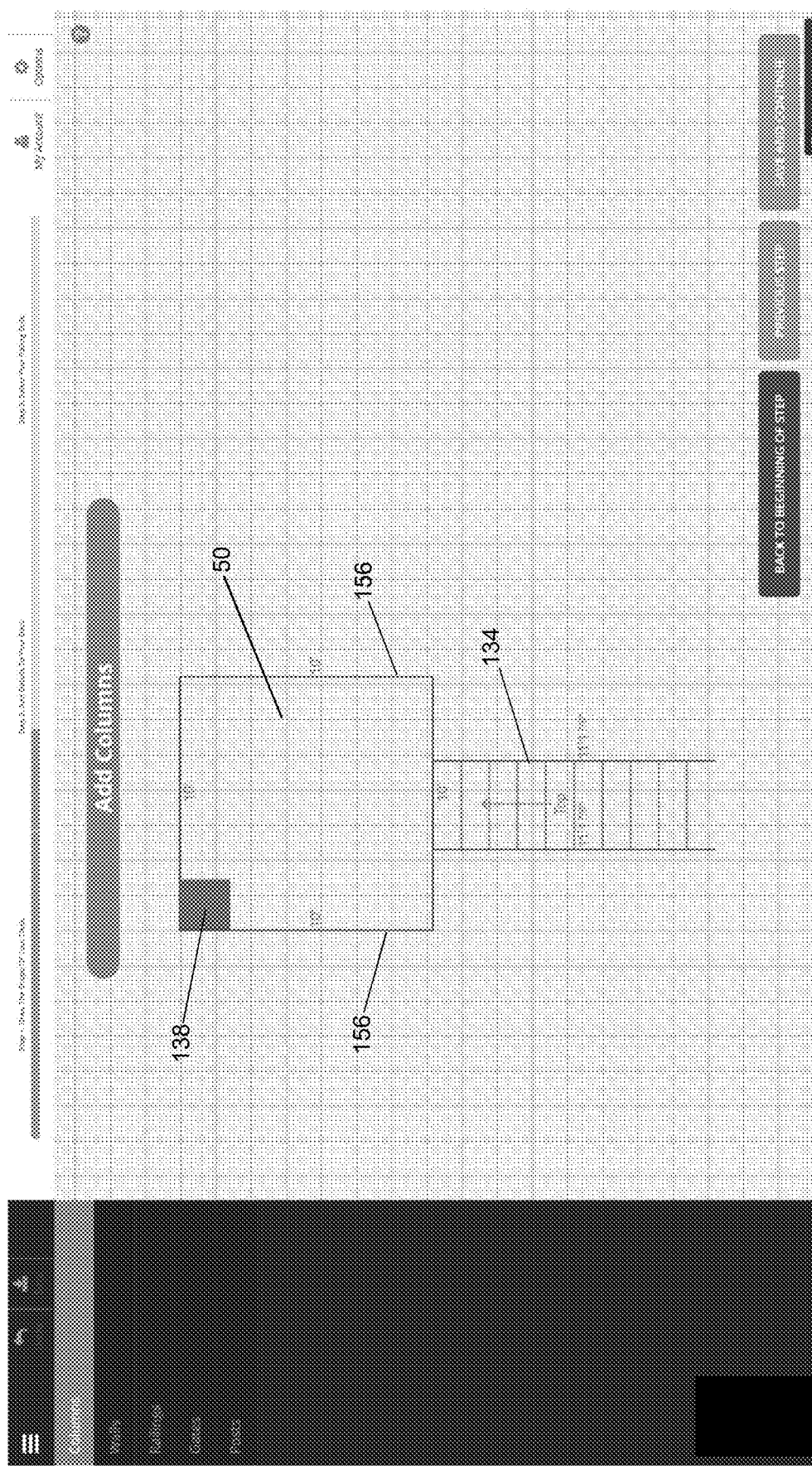
FIG. 9 depicts the deck after input of column information.

Preferably, where the user interface 110 is a graphical user interface, once the remote user 104 has provided the information regarding the column(s) 138, the user interface 110 will provide a graphical representation of the deck 50 with the column(s) 138, as shown in FIG. 9. In the example shown in FIG. 9, one square column 138 is present at the top left-hand corner of the deck 50.

Similarly, if one or more walls 140 are to be present, the remote user 104 may be prompted by the user interface 110 to provide the orientation and length of the wall(s) 140. Preferably, this may be carried out when the remote user 104 selects a side 156 of the deck 50 on the user interface 110 on which the wall 140 is located. Once selected, the user interface 110 will then prompt the remote user 104 to provide the length and position of the wall 140. The user interface 110 may also prompt the remote user 104 to indicate whether the wall 140 is a full-length wall or a partial wall (i.e. does not extend for the full length of a side of the deck 50).

Figure 10:
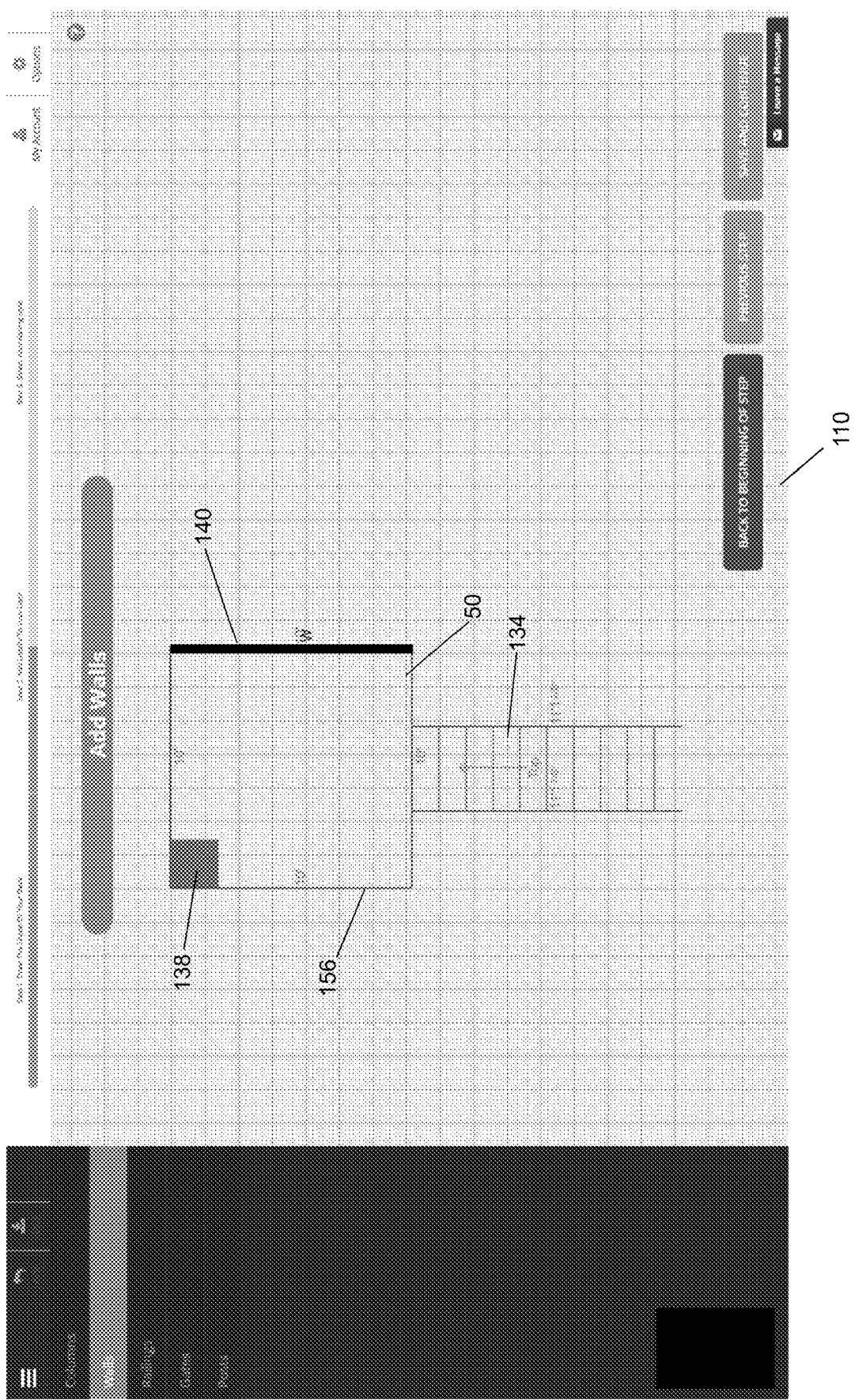
FIG. 10 depicts the deck after input of wall information.

Preferably, where the user interface 110 is a graphical user interface, a graphical representation of the column(s) 138 and wall(s) 140 can be then displayed with the deck(s) 50, as shown in FIG. 10. In the example shown in FIG. 10, one wall 140 is present on the right-hand side of the deck 50.

Figure 11:
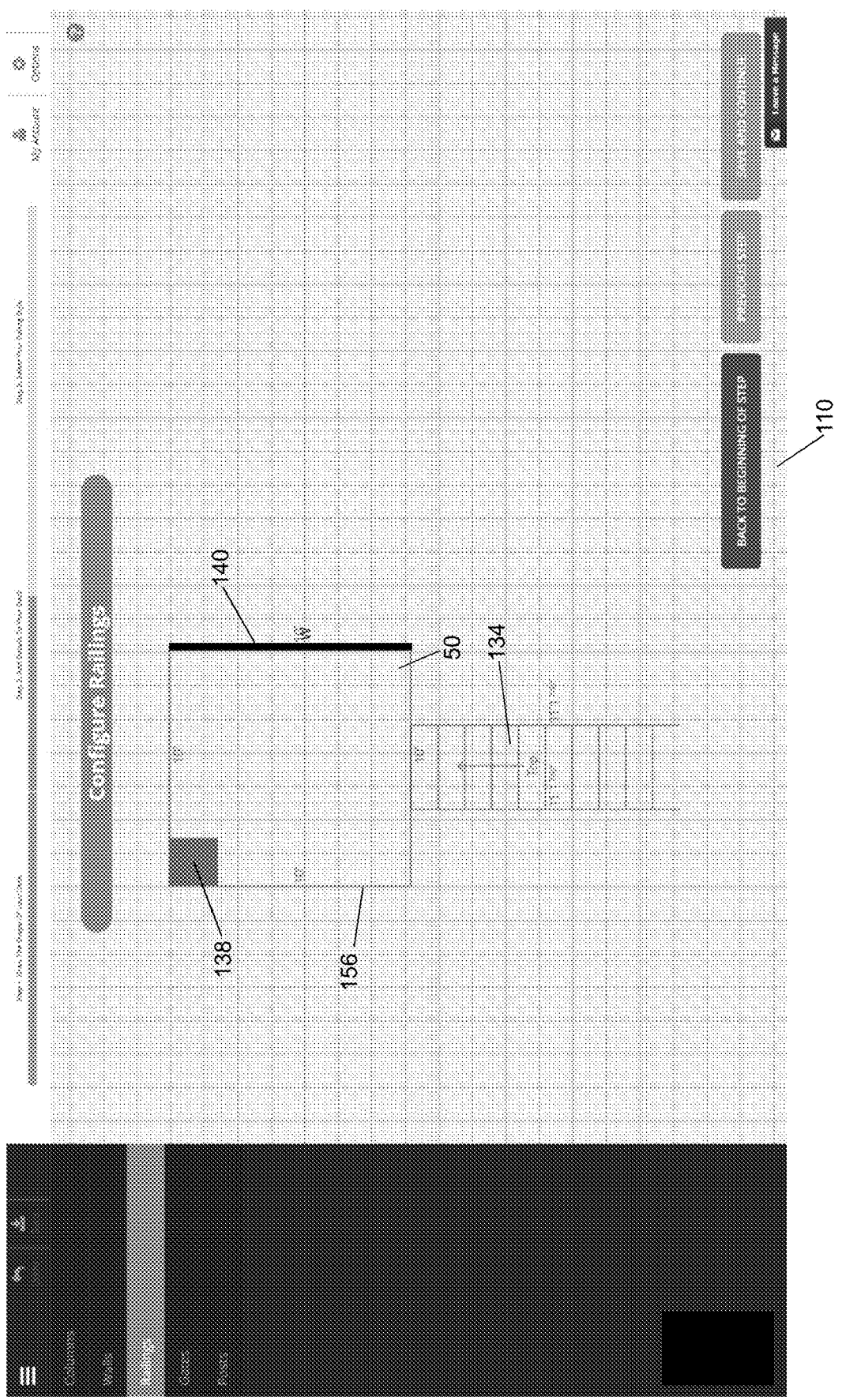
FIG. 11 depicts the deck after input of railing information.

In addition, the remote user 104 may be prompted by the user interface 110 to select one or more sides 156 of the deck(s) 50 for which no railing will be installed. Where the user interface 110 is a graphical user interface, the remote user 104 may select the sides 156 of the deck 50 for which no railing will be installed by selecting the appropriate portions of the deck 50, as shown in FIG. 11.

Figure 12:
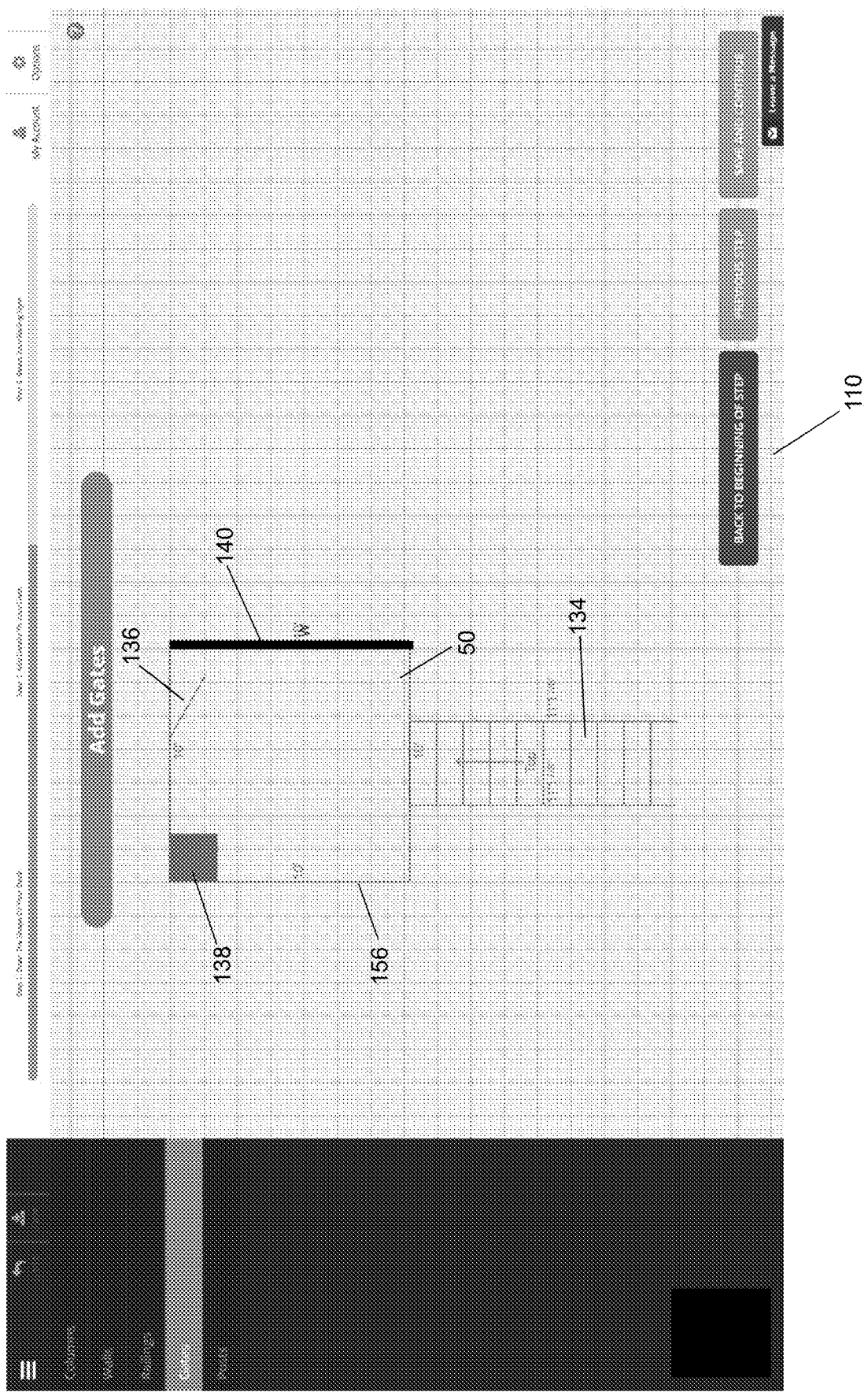
FIG. 12 depicts the deck after input of gate information.

Next, the remote user 104 may also be prompted by the user interface 110 to select one or more locations on the deck 50 for inserting additional gates 136 (step 212). Preferably, this is carried out when the remote user 104 selects a side 156 of the deck 50 on the user interface 110 on which the gate 136 is to be located. The remote user 104 may specify the position, dimensions (e.g. the width), and orientation (e.g. the swing direction) of the gates 136. Where the user interface 110 is a graphical user interface, a graphical representation of the gates 136 can be displayed with the deck 50, as shown in FIG. 12. In the example shown in FIG. 12, one gate 136 is present on the top side of the deck 50.

Figure 13:
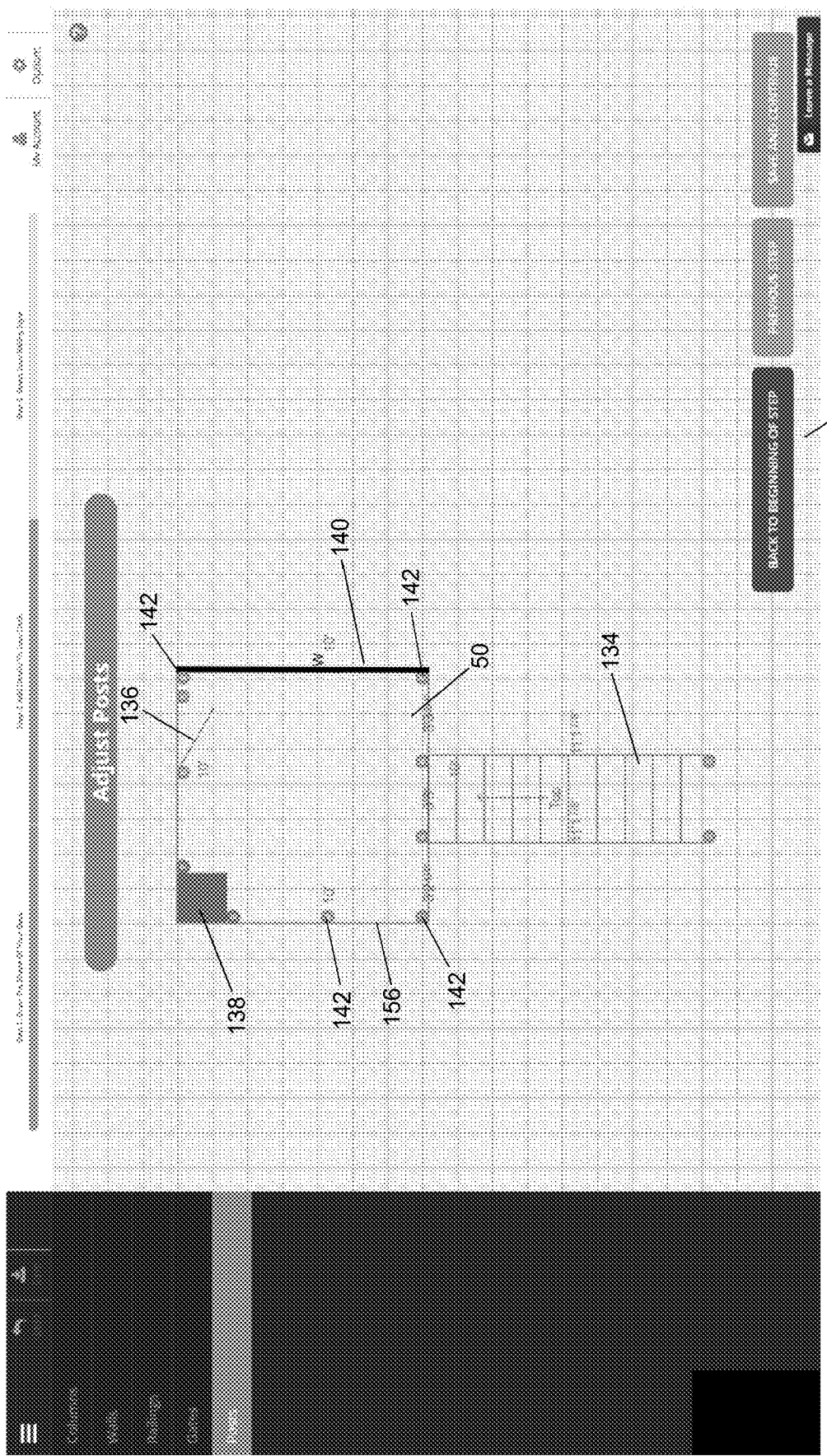
FIG. 13 depicts the deck after the locations of the posts have been determined.

Based on the information provided by the remote user 104 to the user interface 110, the host application 102 determines appropriate locations for posts 142 for the railing system 10 (step 214). This determination takes into account a number of factors, including the distance between respective posts 142, the location of gates 136 (if any), the presence of columns 138 (if any) and walls 140 (if any), the location of stairs 134 (if any), and others. For example, a post 142 should be located proximate to the columns 138 so that the end of the hand rails 12 or base rails 14 can extend from the post 142, resulting in a minimal gap between the post 142 and the column 138. In addition, there may be a maximum allowable distance between adjacent posts 142. Where the user interface 110 is a graphical user interface, a graphical representation of the posts 142 can be displayed, as shown in FIG. 13.

Figure 14:
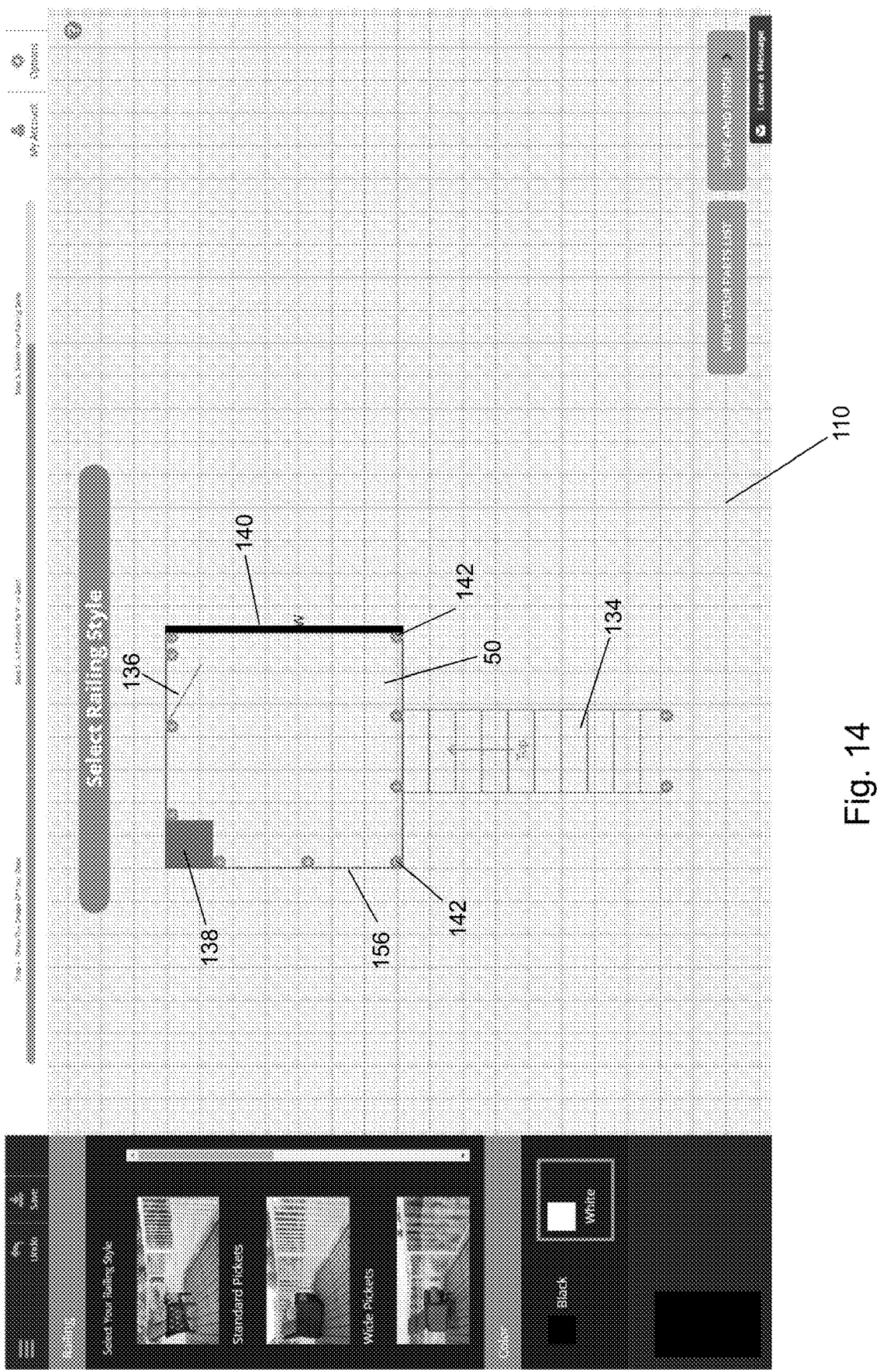
FIG. 14 depicts the deck.

Based on the railing parts data 114, the remote user 104 may also be prompted by the user interface 110 to select certain characteristics for various railing parts 118 (step 216), as shown in FIG. 12. For example, the remote user 104 may be prompted to select a colour for the railing parts 118. The remote user 104 may also be prompted to select a style for pickets 20 or to select using panels (e.g. glass panels, instead of using pickets 20). Where the user interface 110 is a graphical user interface, a graphical representation of the railing system 10 can be displayed, as shown in FIG. 14.

In addition, the host application 102 may restrict certain configurations of the railing system 10 because of physical limitations. For example, if walls 140 are present, the host application 102 may provide the remote user 104 with the option of using one or more brackets for attaching the hand rail 12 and base rail 14 to the walls 140 (instead of the post 16), but only if the brackets can be placed normal to the walls 140. The host application 102 may determine any such limitations based on the configuration of the railing system 10 and the railing parts data 114.

Once the remote user 104 has completed configuration of the railing system 10, the host application 102 determines (step 218) a parts list 146 comprising a list of the railing parts 118 and their respective quantities required to construct the railing system 10. This determination is based on the railing parts data 114 and the configuration of the railing system 10. In order to reduce potential wastage, the determination preferably produces a parts list 146 that comprises a minimum number of each of the railing parts 118 required to construct the railing system 10.

EXAMPLES

The following examples demonstrate how the minimum number for certain ones of the railings parts 118 may be determined for a particular portion of the deck 50, where L=center-to-center span (in mm); P=minimum number of pickets required; S=minimum number of spacers required; d=end spacer length (in mm); and w=glass panel width (in mm).

Example 1: Standard Picket and Spacer Optimization (for 16 mm Pickets and 99.7 mm Spacers)

```
P=1;
Loop:
    d=(L-50.8-(P*16+(P-1)*99.7))/2;
    If d=<99.7
        Goto Out:
    Else
        P=P+1;
Goto Loop;
Out:
    S=(P+1)*2;
    Print P;
    Print S;
```

Example 2: Wide Picket and Spacer Optimization (for 38.1 mm Pickets and 99.7 mm Spacers)

```
P=1;
Loop:
    d=(L-50.8-(P*38.1+(P-1)*99.7))/2;
    If d=<99.7
        Goto Out:
    Else
        P=P+1;
Goto Loop;
Out:
    S=(P+1)*2;
    Print P;
    Print S;
```

Example 3: Stair Picket and Spacer Optimization

```
P=1;
Loop:
    d=(L-50.8-(P*16+(P-1)*116))/2;
    If d=<116
        Goto Out:
    Else
        P=P+1;
Goto Loop;
Out:
    S=(P+1)*2;
    Print P;
    Print S;
```

Example 4: Wide Stair Picket and Spacer Optimization

```
P=1;
Loop:
    d=(L-50.8-(P*38.1+(P-1)*116))/2;
    If d=<116
        Goto Out:
    Else
        P=P+1;
Goto Loop;
Out:
    S=(P+1)*2;
    Print P;
    Print S;
```

Example 4: Glass Picket and Spacer Optimization (for 6 in Glass Panel)

```
P=1;
Loop:
    d=(L-50.8-(P*155+(P-1)*93))/2;
    If d=<93
        Goto Out:
    Else
        P=P+1;
Goto Loop;
Out:
    S=(P+1)*2;
    Print P;
    Print S;
```

Example 5: Glass Panel and Standard Spacer Optimization

```
P=0;
//Glass Selection - may already be correctly
coded in configurator, included for clarity here
If L>=1130.3 AND L<1739.9        //Rail length more than
                                   42.5", less than 66.5"
    w=1067;
Else If L>=1739.9 AND L<=1880    //Rail length more than
                                   66.5", less than 72"
    w=1676;
Else
    ERROR;       //not possible (too big or small),
                 contact customer support if applicable
Loop:
    d=(L-50.8-w-P*(16+99.7))/2;
    If d=<99.7
        Goto Out:
    Else
        P=P+2;
Goto Loop;
Out:
    S=(P+2)*2;
    If P==0
        S=0;     //case where glass gasket is
                 sufficient, no spacers needed
    Print P;
    Print S;
```

Example 6: Glass Panel and Wide Spacer Optimization

```
P=0;
//Glass Selection - may already be correctly coded in configurator, included for clarity here
If L>=1130.3 AND L<1739.9        //Rail length more than 42.5", less than 66.5"
    w=1067;
Else If L>=1739.9 AND L<=1880    //Rail length more than 66.5", less than 72"
    w=1676;
Else
    ERROR;       //not possible (too big or small), contact customer support if applicable
Loop:
    d=(L-50.8-w-P*(38.1+99.7))/2;
    If d=<99.7
        Goto Out:
    Else
        P=P+2;
Goto Loop;
Out:
    S=(P+2)*2;
    If P==0
        S=0;     //case where glass gasket is sufficient, no spacers needed
    Print P;
    Print S;
``` address 128 for the project 124, the host application 102 determines the appropriate area for the address 128 and, based on the building regulations data 150, determines the appropriate building regulations for the project 124.

Thereafter, the host application 102 applies the appropriate building regulations to restrict the configuration of the railing system 10. For example, certain areas (e.g. Florida) prohibit the use of glass panels. Therefore, if the remote user 104 indicates that the project 124 is located in Florida, the host application 102 will apply the appropriate building regulations from Florida and prevent the remote user 104 from subsequently selecting glass panels for the project. The user interface 110 may provide a warning to the remote user 104 advising of the restriction.

In addition to the use of glass panels, building regulations may also limit the maximum length for hand rails 12 and base rails 14. This may differ in different areas and may also differ based on whether it is in a residential or commercial setting. Therefore, depending on the address 128 for the project and its setting (i.e. residential or commercial), the host application 102 applies the appropriate building regulation from the building regulations data 148 to restrict the configuration of the railing system 10. This restriction may include restricting the placement of posts 142 so that the hand rails 12 and base rails 14 are appropriately separated by the posts 142 (e.g. such that the hand rails 12 and base rails 14 are not too long).

Preferably, the host application 104 stores the configuration of the railing system 10, the parts list 146, the kits list 148, and the address 128 in the database 112 as a project 124 in the project data 126 for later retrieval. In addition, the host Based on the parts list 146, the host application 102 determines (step 220) a kits list 148 comprising a list of the kits 120 required to construct the railing system 124. This determination is based on the railing kit data 116 and the parts list 146. In order to reduce potential wastage, the determination preferably produces a kits list 148 that comprises a minimum number of each of the kits 120 required to construct the railing system 10.

Figure 15:
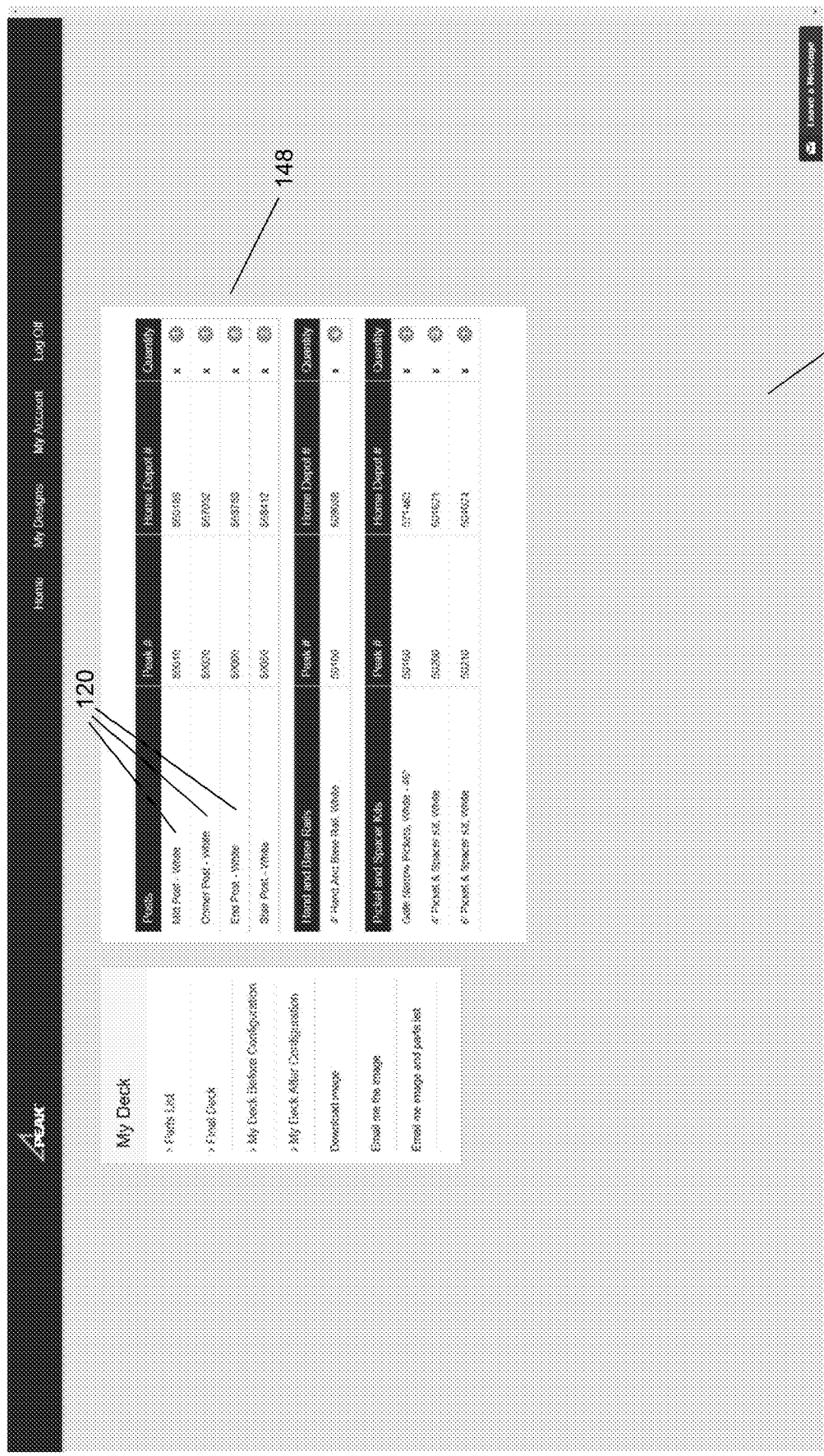
FIG. 15 depicts an exemplary kits list for the deck.

The kits list 148 is preferably displayed (step 222) on the user interface 110, as shown in FIG. 15. If desired, the parts list 146 may also be displayed on the user interface 110.

In another embodiment, the database 112 further comprises building regulations data 150. The building regulations data 150 comprises information on building regulations for different areas. When the remote user 104 enters the address 128 for the project 124, the host application 102 application 104 preferably provides the remote user 104 with the ability to save the project 124 at any time throughout the process, through appropriate input on the user interface 110.

Figure 16:
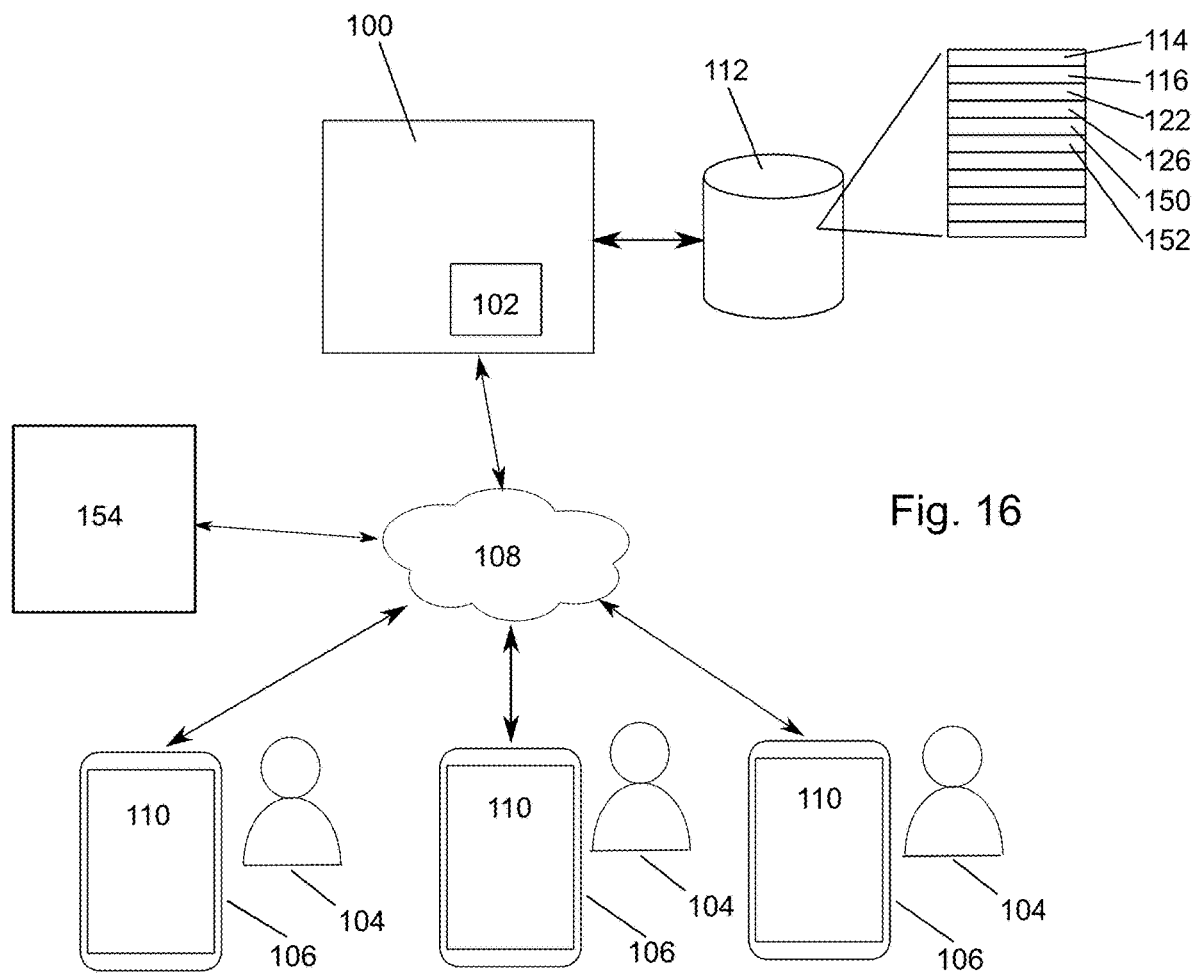
FIG. 16 is a block diagram of another embodiment of the invention.

In another embodiment shown in FIG. 16, the host application 102 may also determine the kits list 148 so that the cost to purchase all of the kits 120 in the kits list 148 is minimized. In other words, in addition to optimization based on building regulations and/or physical limitations, the host application 102 can also provide a degree of cost optimization. In order to do so, the database 112 may also comprise cost data 152 relating to the cost to purchase each of the kits 120.

The cost data 152 may be based on estimated costs for each of the kits 120. These estimated costs may already be stored in the database 112. Alternatively, referring to FIG. 16, the host application 102 may also, from time to time, update the cost data 152 in the database 112 by retrieving over the communications network 108 current cost data 152 from third parties 154, such as retailers. In addition to retrieving the current cost data 152 from time to time, the host application 102 may also retrieve real-time cost data 152 from third parties 154 each time a determination of the kits list 148 is made.

For example, the hardware associated with constructing a section of fencing (e.g. pickets 20, hand rails 12, etc.) may be sold in different kits 120 corresponding to different configurations. In a first kit 120a, the included hardware may comprise the hardware required to construct a 4-foot section of fencing, while in a second kit 120b, the included hardware may comprise the hardware required to construct a 6-foot section of fencing. If the railing system 10 required a 10-foot section of fencing, the host application 102 may determine, based on the cost data 152, that it would be more cost efficient to use one of the first kit 120a and one of the second kit 120b, rather than three of the first kits 120a. This could also result in less wastage of material.

The host application 102 is able to determine the kits list 148 based on one or both of the following factors: (1) an absolute minimum of kits 120 required for the railing system 10; and (2) a minimum total cost to purchase the kits 120 required for the railing system 10. In some cases, the two factors may result in identical kits lists 148; however, there may be instances when they will result in different kits lists 148 (e.g. where there are discounts for certain kits 120). For example, in the example described above, if the first kit 120a cost $10 each and the second kit 120b cost $30 each, then it would be more cost efficient to purchase three of the first kits 120a (for a total of $30), rather than purchasing one of the first kit 120a and one of the second kit 120b (for a total of $40).

Figure 17:
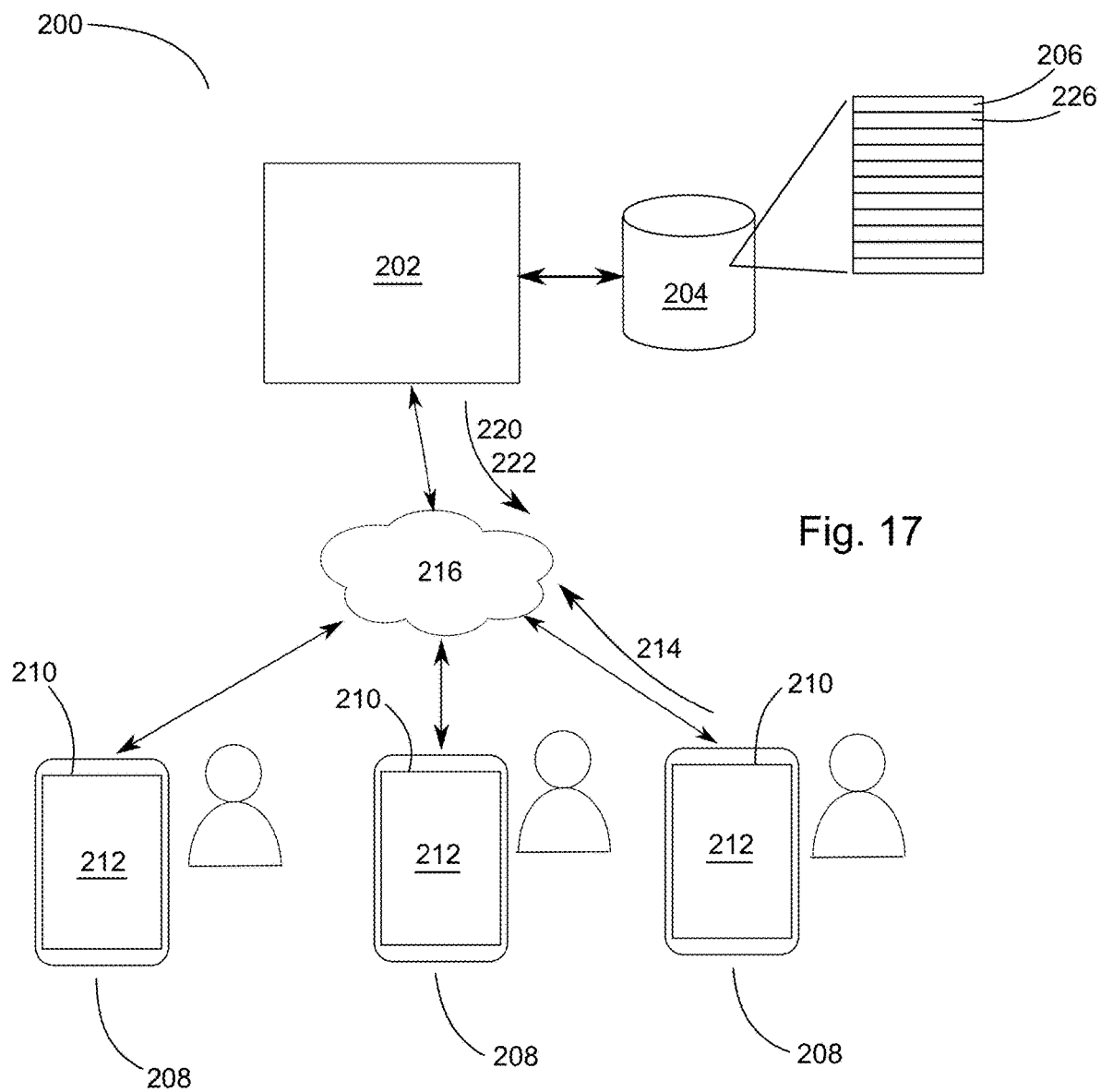
FIG. 17 depicts another embodiment of the invention.

Referring to FIG. 17, in another embodiment, system 200 for facilitating construction of the deck 50 comprises server 202 and database 204 that is operationally connected to the server 202. The database 204 comprises parts information 206, which has information regarding parts for the deck 50, such as the hand rails 12, the base rails 14, the posts 16, the panels 18, the pickets 20, and the spacers 22. The information may include dimensions of the parts.

The system 200 further comprises one or more client computers 208 that are in communication with the server 202 over network 216, such as the Internet. This communication may be wired or wireless. For example, the communications may be through cellular signals, through Wi-Fi, Bluetooth, etc. The client computer 208 preferably comprises display 210 for displaying user interface 212. The client computer 208 may be a desktop computer, a laptop computer, a tablet computer, a smartphone, or the like. The client computer 208 is configured to accept input through the user interface 212 from a user regarding deck information 214. The deck information 214 may comprise information regarding the deck 50, such as dimensions or layout.

The client computer 208, after accepting input of the deck information 214 from the user, is further configured to transmit the deck information 214 to the server 202 over the network 216.

Upon receipt of the deck information 214 from the client computer 208, the server 202 is configured to convert the deck information 214 into component information 218. The component information 218 includes information regarding one or more of the individual components of the deck. For example, the component information 218 may include information regarding the hand rails 12, the base rails 14, the posts 16, the panels 18, the pickets 20, and the spacers 22 for the deck 50. Based at least in part on the component information 218 and the parts information 206, the server 202 is further configured to generate a parts list 220 comprising the minimum quantities of the parts required for the deck 50.

Since the information regarding the parts in the parts information 206 may be for standard parts, alterations to the standard parts are likely needed in order to construct the deck 50. Therefore, the server 202 is further configured to generate, based at least in part on the parts information 206, the component information 218, and the parts list 220, instruction information 222. The instruction information 222 comprises information regarding alterations to be made to the parts required for the deck 50. For example, if one or more of the hand rails 12 need to be cut in order to fit the dimensions of the deck 50, this would be included in the instruction information 222.

The server 202 transmits the parts list 220 and the instruction information 222 to the client computer 208 over the network 216. The client computer 208 is then configured to display the parts list 220 and the instruction information 222 through the user interface 212 on the display 210. The parts list 220 and the instruction information 222 may be formatted in various ways to present the information therein in a more user-friendly manner.

Figure 22:
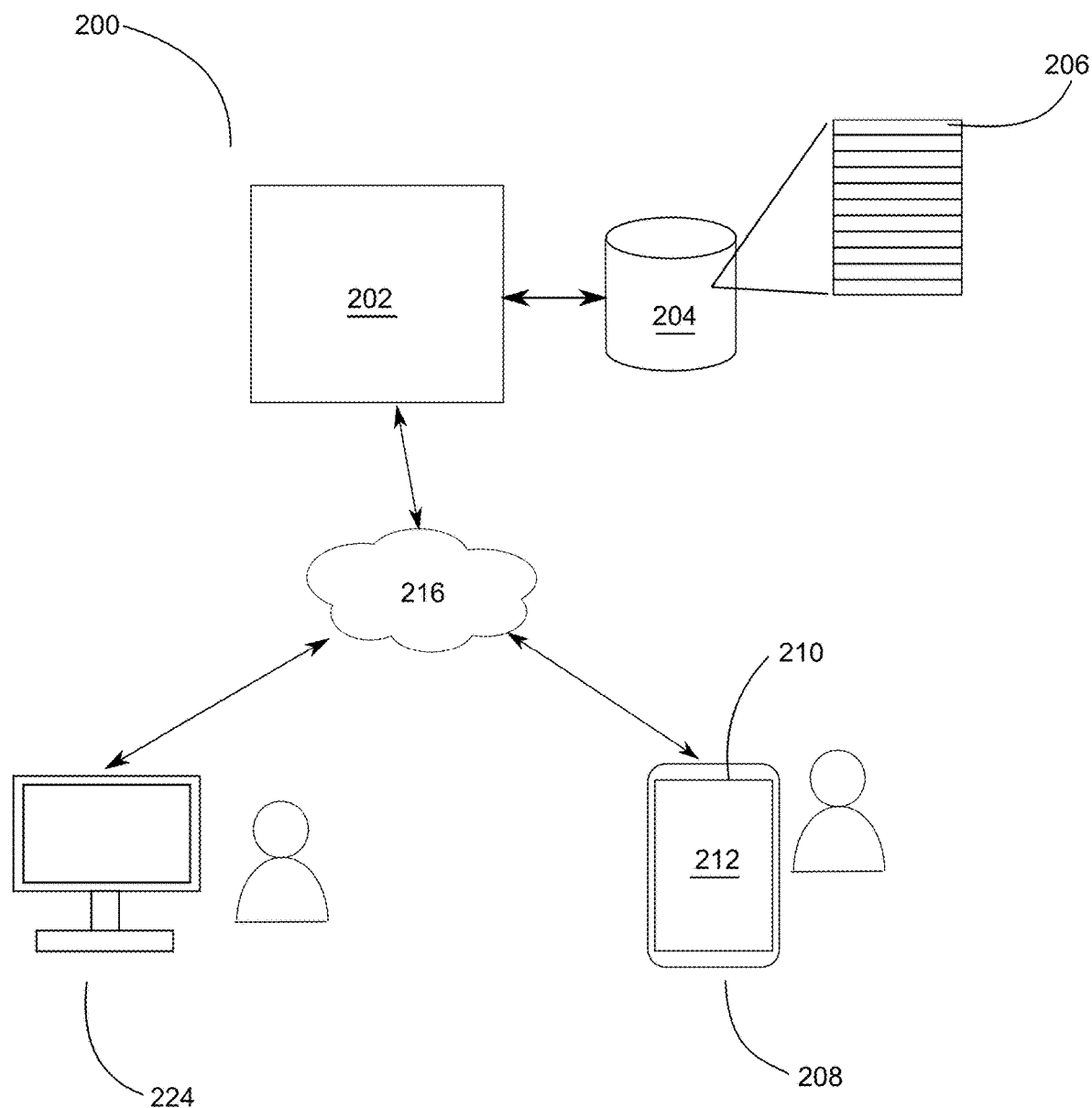
FIG. 22 depicts the system in accordance with another embodiment of the invention.

In another embodiment, referring to FIG. 22, the system 200 further comprises a computer service computer 224 in communication with the server 202 over the network 216. The customer service computer 224 may be operated by a customer service agent. In this embodiment, the user, through the user interface 212, may request to the server 202 that a chat session be initiated between the client computer 208 and the customer service computer 224. Upon receipt of such a request by the server 202, the server 202 will communicate with the customer service computer 224 to initiate the chat session between the client computer 208 and the customer service computer 224. Preferably, communications during the chat session will pass through the server 202; however, it is also possible that communications during the chat sessions will be directly between the client computer 208 and the customer service computer 224.

The chat session will allow the user and the customer service agent to communicate, in real time, regarding any issues the user may be encountering.

The chat session may be of a video chat session or an audio chat session, or a combination of both. In order to engage in a video or audio chat session, the client computer 208 and the customer service computer 224 will both need to be equipped with cameras or microphones, respectively.

The database 204 may also include ordering information 226 regarding pricing and inventory of the parts. In such a case, the server 202 may use the ordering information 226 when generating the parts list 220 so that the pricing of the parts for the deck 50 is included. In addition, the server 202 may use the ordering information 226 when generating the parts list 220 so that only the parts that are available are included in the parts list 220 (e.g. depending on the inventory levels of the parts in the ordering information 226).

Furthermore, based on the ordering information 226, the server 202 may also, when generating the parts list 220, include a total price for the deck 50.

Figure 18:
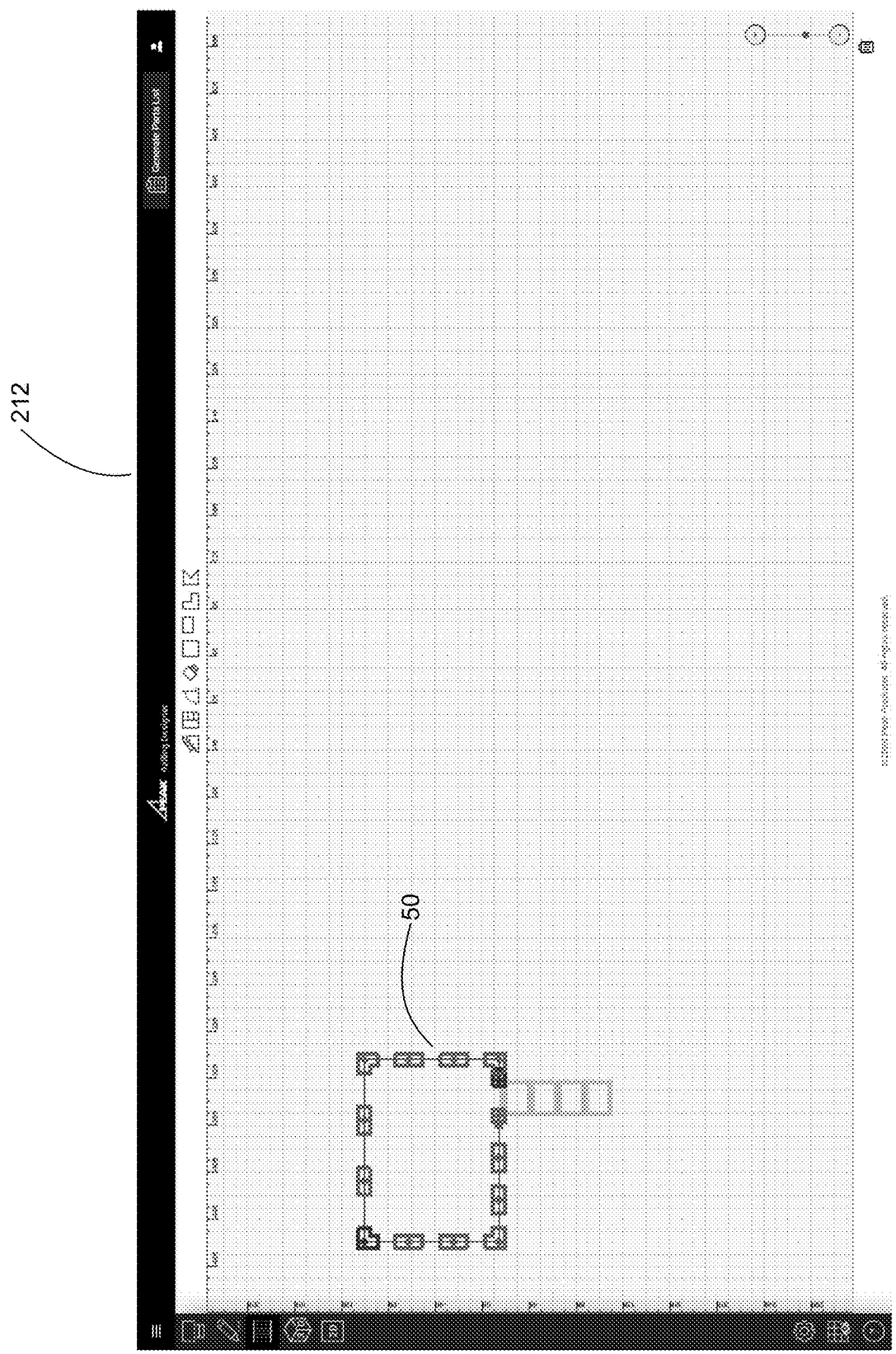
FIG. 18 depicts a screenshot of the user interface for editing a deck in accordance with the embodiment of FIG. 17.

As described above, the user interface 212 is configured to accept input from the user regarding the deck 50. In one embodiment, the user interface 212 is configured to accept touch input for drawing an outline for the deck 50. Upon drawing the outline for the deck 50, the user may make changes or modifications to the deck 50 (see FIG. 18).

Figure 19:
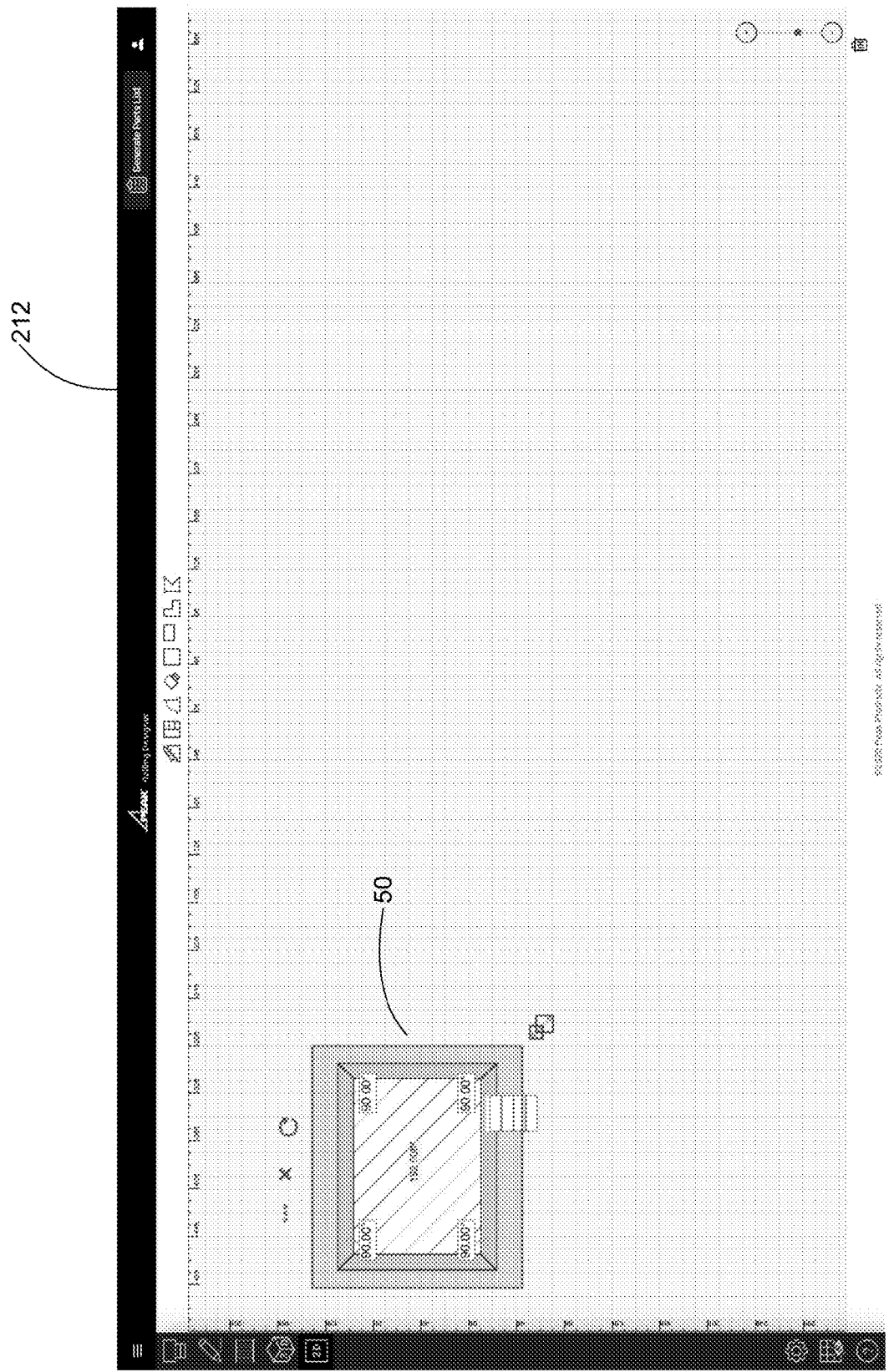
FIG. 19 depicts a screenshot of the user interface showing a two-dimensional representation of the deck in accordance with the embodiment of FIG. 17.
Figure 20:
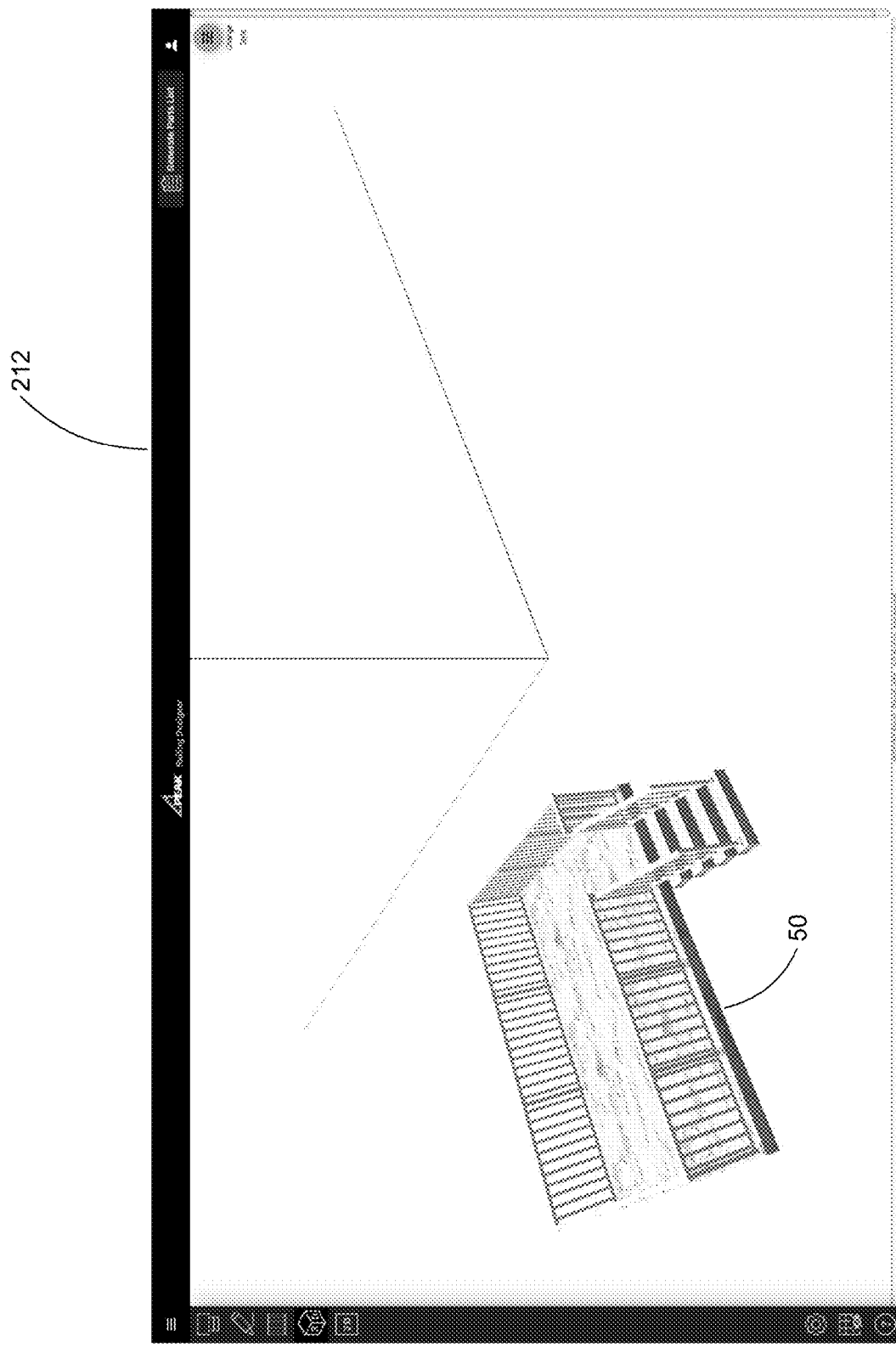
FIG. 20 depicts a screenshot of the user interface showing a three-dimensional representation of the deck in accordance with the embodiment of FIG. 17.

Preferably, the user interface 212 is further configured to display a graphical representation of the deck 50. The graphical representation may include a two-dimensional view (see FIG. 19) and a three-dimensional view (see FIG. 20) of the deck 50. Preferably, the user interface 212 will allow the user to manipulate, by touch input, the graphical representation of the deck 50, such as rotating the view of the graphical representation of the deck 50.

Figure 21:
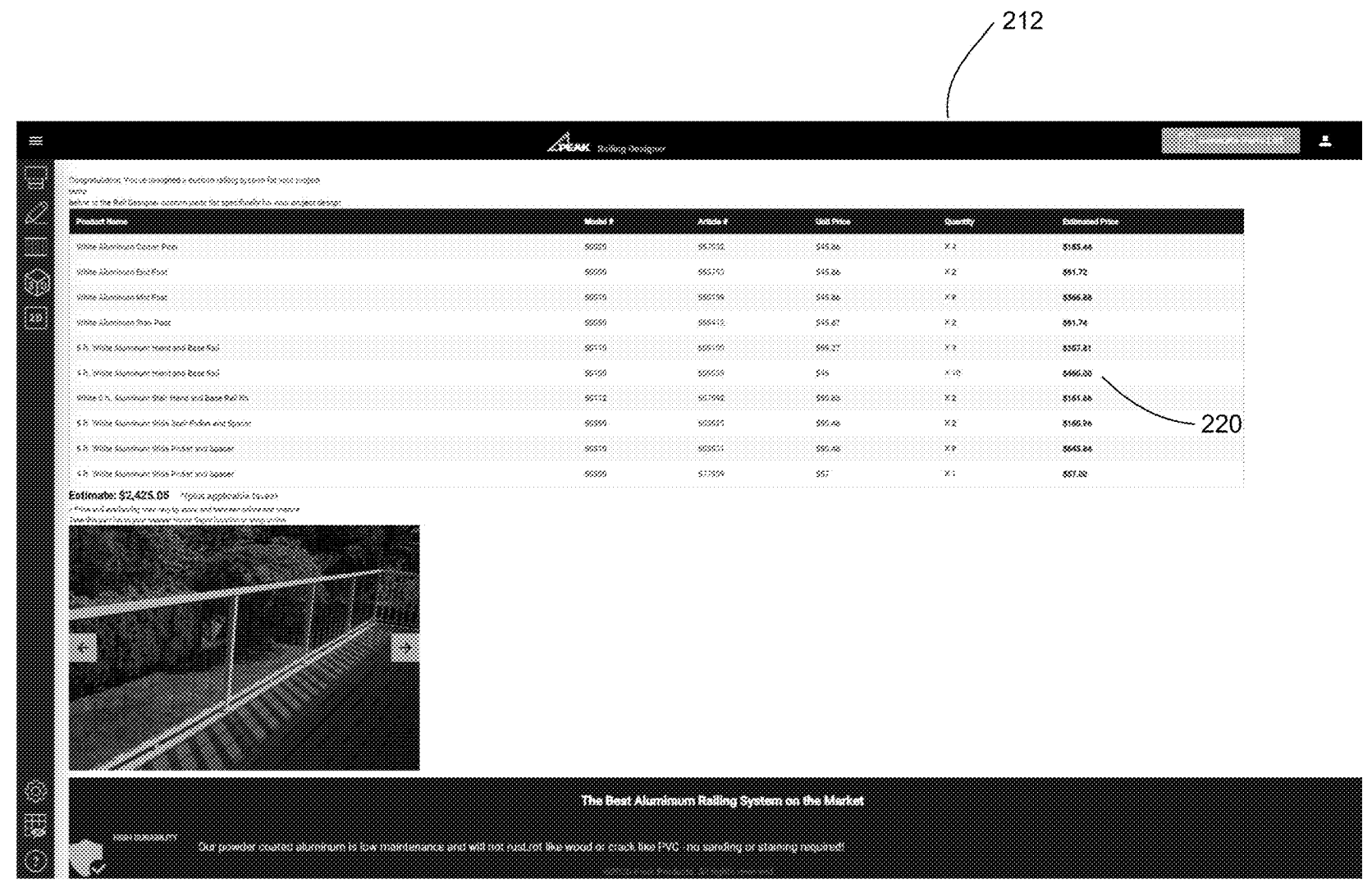

The user interface 212 is also preferably configured to display (FIG. 21) the parts list 220 upon request by the user.

It will be appreciated by those skilled in the art that the preferred embodiment has been described in some detail but that certain modifications may be practiced without departing from the principles of the invention.

The invention claimed is:

1. A system for facilitating construction of a deck by a user and a customer service agent, the system comprising:
    a server;
    a database operationally connected to the server, the database comprising parts information regarding a plurality of parts for the deck and data regarding an organization of the one or more parts into one or more kits;
    a client computer in communication with the server, the client computer comprising a display for displaying a user interface, wherein the user interface is configured to accept textual input from the user deck information, wherein the deck information comprises information regarding dimensions and layout of the deck, wherein the user interface is further configured to accept graphical input regarding the deck, wherein the graphical input comprises a drawing by the user of the deck on a grid displayed on the user interface, and wherein the user interface is further configured to accept a request by the user for a chat session with the customer service agent; and
    a customer service computer in communication with the server, the customer service computer configured to initiate a chat session between the customer service computer and the client computer upon receipt by the server of the request for a chat session, wherein the chat session allows for communication between the customer service agent and the user, through the customer service computer and the client computer, respectively;
    wherein the client computer is further configured to transmit the deck information and the drawing to the server;
    wherein the server is configured to generate a graphical representation of the deck, the graphical representation based, at least in part, on the drawing, the deck information, and one or more criteria regarding placement of the parts for the deck;
    wherein the server is further configured to convert the deck information into component information, wherein the component information comprises information regarding one or more of the individual components of the deck;
    wherein the server is further configured to generate, based at least in part on the component information and the parts information, a list comprising minimum quantities of the parts required for the deck;
    wherein the server is further configured to generate, based at least in part on the parts information, the component information, and the list, instruction information regarding alterations to be made to the parts required for the deck;
    wherein the server is further configured to transmit the list, the instruction information, and the graphical representation to the client computer;
    wherein the user interface is configured to display a menu bar on a first portion thereof, the menu bar configured to allow the user to toggle the user interface to display on a second portion thereof between a three-dimensional and a two-dimensional view of the graphical representation, the user interface further configured to allow the user to manipulate the three-dimensional or the two-dimensional views of the graphical representation using touch input on the user interface; and
    wherein the user interface is further configured to display the list or the instruction information upon request by the user through the user interface.

2. The system of claim 1, wherein the chat session is a video chat session.

3. The system of claim 1, wherein the chat session is an audio chat session.

4. The system of claim 1, wherein the database further comprises ordering information, wherein the ordering information comprises information regarding pricing and inventory of each of the plurality of parts.

5. The system of claim 4, wherein the server is further configured to generate a price, wherein the price is based, at least in part, on the pricing and the inventory of the parts required for the deck.

6. The system of claim 1, wherein the user interface is further configured to accept touch input from the user for the graphical input.

7. The system of claim 1, wherein the plurality of parts comprises one or more of the following: railings, pickets, posts, and panels.

8. The system of claim 1, wherein the user interface is further configured to allow for the user to input changes to the deck information.

* * * * *